(12) United States Patent
Choi et al.

(10) Patent No.: US 12,443,180 B2
(45) Date of Patent: Oct. 14, 2025

(54) ROBOTIC LAWN MOWERS

(71) Applicant: TECHTRONIC CORDLESS GP, Anderson, SC (US)

(72) Inventors: Man Ho Choi, Kwai Chung (CN); Hei Man Lee, Kwai Chung (CN); Shing Hin Li, Kwai Chung (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 240 days.

(21) Appl. No.: 17/984,048

(22) Filed: Nov. 9, 2022

(65) Prior Publication Data

US 2023/0142590 A1    May 11, 2023

Related U.S. Application Data

(60) Provisional application No. 63/278,079, filed on Nov. 10, 2021.

(51) Int. Cl.
*G05D 1/00* (2024.01)
*A01D 34/00* (2006.01)

(52) U.S. Cl.
CPC ......... *G05D 1/0027* (2013.01); *A01D 34/008* (2013.01); *G05D 1/0022* (2013.01)

(58) Field of Classification Search
CPC ............................ G05D 1/0027; A01D 34/008
See application file for complete search history.

(56) References Cited

U.S. PATENT DOCUMENTS

| | | | |
|---|---|---|---|
| 923,312 | A | 6/1909 | Alexanderson |
| 2,511,124 | A | 6/1950 | Phelps |
| 2,539,779 | A | 1/1951 | Grosso |
| 2,701,942 | A | 2/1955 | Caldwell, Jr. et al. |
| 2,751,030 | A | 6/1956 | Null |
| 2,914,902 | A | 12/1959 | Beymer |
| 3,057,140 | A | 10/1962 | Ridenour et al. |
| 3,147,662 | A | 9/1964 | Snook |
| 3,311,738 | A | 3/1967 | Makow |
| 3,393,598 | A | 7/1968 | Bettinger |
| 3,500,622 | A | 3/1970 | Bowen |
| 3,570,227 | A | 3/1971 | Bellinger |
| 3,612,574 | A | 10/1971 | Klopfer et al. |
| 3,680,295 | A | 8/1972 | Rutherford |

(Continued)

FOREIGN PATENT DOCUMENTS

| | | |
|---|---|---|
| AU | 2006100911 A4 | 11/2006 |
| AU | 2011239326 A1 | 11/2011 |

(Continued)

OTHER PUBLICATIONS

US 8,272,092 B2, 09/2012, Schnittman et al. (withdrawn)

(Continued)

*Primary Examiner* — Joan T Goodbody
*Assistant Examiner* — Godfrey Aleksander Maciorowski
(74) *Attorney, Agent, or Firm* — Dority & Manning, P.A.

(57) ABSTRACT

A method of operating a mowing system, the method including mowing within a work area, wherein mowing is performed by a robotic lawn mower, and wherein the work area comprises a plurality of base stations each configured to charge the robotic lawn mower; determining when to charge the robotic lawn mower in view of a current charge level and a current location of the robotic lawn mower.

31 Claims, 6 Drawing Sheets

(56) References Cited

U.S. PATENT DOCUMENTS

| | | |
|---|---|---|
| 3,776,327 A | 12/1973 | Klopfer et al. |
| 4,065,913 A | 1/1978 | Fisher et al. |
| 4,126,990 A | 11/1978 | Fisher et al. |
| 4,126,991 A | 11/1978 | Gobin et al. |
| 4,165,597 A | 8/1979 | Scanland et al. |
| 4,205,510 A | 6/1980 | Raniero |
| 4,268,964 A | 5/1981 | Moore |
| 4,306,375 A | 12/1981 | Goldfarb et al. |
| 4,333,202 A | 6/1982 | Block |
| 4,351,132 A | 9/1982 | Molin |
| 4,468,884 A | 9/1984 | Goldfarb et al. |
| 4,492,058 A | 1/1985 | Goldfarb et al. |
| 4,511,343 A | 4/1985 | Goldfarb et al. |
| 4,522,606 A | 6/1985 | Goldfarb et al. |
| 4,547,166 A | 10/1985 | Goldfarb et al. |
| 4,591,347 A | 5/1986 | Goldfarb et al. |
| 4,596,412 A | 6/1986 | Everett et al. |
| 4,627,563 A | 12/1986 | Meyer |
| 4,652,247 A | 3/1987 | Goldfarb et al. |
| 4,673,370 A | 6/1987 | Goldfarb et al. |
| 4,693,656 A | 9/1987 | Guthrie |
| 4,787,794 A | 11/1988 | Guthrie |
| 4,826,066 A | 5/1989 | Koester et al. |
| 4,902,260 A | 2/1990 | Im |
| 4,916,813 A | 4/1990 | Elia |
| 4,951,985 A | 8/1990 | Pong et al. |
| 4,958,068 A | 9/1990 | Pong et al. |
| 4,962,453 A | 10/1990 | Pong et al. |
| 4,964,265 A | 10/1990 | Young |
| 4,968,878 A | 11/1990 | Pong et al. |
| 5,024,728 A | 6/1991 | Morita et al. |
| 5,025,969 A | 6/1991 | Koester et al. |
| 5,323,593 A | 6/1994 | Cline et al. |
| 5,363,633 A | 11/1994 | Masaru |
| 5,402,110 A | 3/1995 | Oliver et al. |
| 5,406,778 A | 4/1995 | Lamb et al. |
| 5,507,137 A | 4/1996 | Norris |
| 5,540,037 A | 7/1996 | Lamb et al. |
| 5,548,278 A | 8/1996 | Oliver et al. |
| 5,553,445 A | 9/1996 | Lamb et al. |
| 5,561,972 A | 10/1996 | Rolfe |
| 5,572,856 A | 11/1996 | Ku |
| 5,577,868 A | 11/1996 | Chen |
| 5,703,569 A | 12/1997 | Oliver et al. |
| 5,785,480 A | 7/1998 | Difeo |
| 5,821,731 A | 10/1998 | Kuki et al. |
| 5,850,135 A | 12/1998 | Kuki et al. |
| 5,916,111 A | 6/1999 | Colens |
| 5,942,869 A | 8/1999 | Katou et al. |
| 6,076,025 A | 6/2000 | Ueno et al. |
| 6,101,795 A | 8/2000 | Diekhans |
| 6,212,917 B1 | 4/2001 | Rathbun |
| 6,255,793 B1 | 7/2001 | Peless et al. |
| 6,300,737 B1 | 10/2001 | Bergvall et al. |
| 6,321,515 B1 | 11/2001 | Colens |
| D451,931 S | 12/2001 | Abramson et al. |
| 6,338,013 B1 | 1/2002 | Ruffner |
| 6,339,735 B1 | 1/2002 | Peless et al. |
| 6,417,641 B2 | 7/2002 | Peless et al. |
| 6,442,845 B2 | 9/2002 | Wheeler et al. |
| 6,443,509 B1 | 9/2002 | Levin et al. |
| 6,460,253 B1 | 10/2002 | Wheeler et al. |
| 6,465,982 B1 | 10/2002 | Bergvall et al. |
| 6,481,515 B1 | 11/2002 | Kirkpatrick et al. |
| 6,493,613 B2 | 12/2002 | Peless et al. |
| 6,502,017 B2 | 12/2002 | Ruffner |
| 6,525,509 B1 | 2/2003 | Petersson et al. |
| 6,586,908 B2 | 7/2003 | Petersson et al. |
| 6,594,844 B2 | 7/2003 | Jones |
| 6,600,981 B2 | 7/2003 | Ruffner |
| 6,604,348 B2 | 8/2003 | Hunt |
| 6,611,738 B2 | 8/2003 | Ruffner |
| 6,615,108 B1 | 9/2003 | Peless et al. |
| 6,636,847 B1 | 10/2003 | Spires |
| 6,650,975 B2 | 11/2003 | Ruffner |
| 6,662,889 B2 | 12/2003 | De Fazio et al. |
| 6,728,607 B1 | 4/2004 | Anderson |
| 6,763,282 B2 | 7/2004 | Glenn et al. |
| 6,779,217 B2 | 8/2004 | Fisher |
| 6,809,490 B2 | 10/2004 | Jones et al. |
| 6,813,557 B2 | 11/2004 | Schmidt et al. |
| 6,850,024 B2 | 2/2005 | Peless et al. |
| 6,870,792 B2 | 3/2005 | Chiappetta |
| 6,879,878 B2 | 4/2005 | Glenn et al. |
| 6,885,912 B2 | 4/2005 | Peless et al. |
| 6,907,336 B2 | 6/2005 | Gray et al. |
| 6,934,615 B2 | 8/2005 | Flann et al. |
| 6,984,952 B2 | 1/2006 | Peless et al. |
| 7,010,425 B2 | 3/2006 | Gray et al. |
| 7,024,842 B2 | 4/2006 | Hunt et al. |
| 7,024,843 B2 | 4/2006 | Hunt et al. |
| 7,047,712 B1 | 5/2006 | Hunt et al. |
| 7,053,580 B2 | 5/2006 | Aldred |
| 7,069,111 B2 | 6/2006 | Glenn et al. |
| 7,076,348 B2 | 7/2006 | Bucher et al. |
| 7,079,923 B2 | 7/2006 | Abramson et al. |
| 7,079,943 B2 | 7/2006 | Flann et al. |
| 7,085,624 B2 | 8/2006 | Aldred et al. |
| 7,103,457 B2 | 9/2006 | Dean |
| 7,110,881 B2 | 9/2006 | Gray et al. |
| 7,114,318 B2 | 10/2006 | Poulson et al. |
| 7,117,660 B1 | 10/2006 | Colens |
| 7,133,746 B2 | 11/2006 | Abramson et al. |
| 7,146,786 B2 | 12/2006 | Brandon |
| 7,155,308 B2 | 12/2006 | Jones |
| 7,155,309 B2 | 12/2006 | Peless et al. |
| 7,166,983 B2 | 1/2007 | Jung |
| 7,167,775 B2 | 1/2007 | Abramson et al. |
| 7,173,391 B2 | 2/2007 | Jones et al. |
| 7,174,157 B2 | 2/2007 | Gassho et al. |
| 7,211,980 B1 | 5/2007 | Bruemmer et al. |
| 7,216,033 B2 | 5/2007 | Flann et al. |
| 7,227,334 B2 | 6/2007 | Yang et al. |
| 7,228,214 B2 | 6/2007 | Flann et al. |
| 7,233,683 B2 | 6/2007 | Han et al. |
| 7,242,791 B2 | 7/2007 | Han et al. |
| 7,286,902 B2 | 10/2007 | Kim et al. |
| D559,867 S | 1/2008 | Abramson |
| 7,332,890 B2 | 2/2008 | Cohen et al. |
| 7,349,759 B2 | 3/2008 | Peless et al. |
| 7,363,994 B1 | 4/2008 | DeFazio et al. |
| 7,369,460 B2 | 5/2008 | Chiappetta et al. |
| 7,369,924 B2 | 5/2008 | Han et al. |
| 7,388,343 B2 | 6/2008 | Jones et al. |
| D573,610 S | 7/2008 | Abramson |
| 7,395,648 B1 | 7/2008 | Silbernagel et al. |
| 7,418,328 B2 | 8/2008 | Romig |
| 7,429,843 B2 | 9/2008 | Jones et al. |
| 7,430,455 B2 | 9/2008 | Casey et al. |
| 7,444,214 B2 | 10/2008 | Cho et al. |
| 7,469,525 B2 | 12/2008 | Zeigler et al. |
| 7,474,941 B2 | 1/2009 | Kim et al. |
| 7,480,958 B2 | 1/2009 | Song et al. |
| 7,480,960 B2 | 1/2009 | Kim |
| 7,497,053 B2 | 3/2009 | Nicolet |
| 7,499,774 B2 | 3/2009 | Barrett et al. |
| 7,499,775 B2 | 3/2009 | Filippov et al. |
| 7,499,776 B2 | 3/2009 | Allard et al. |
| 7,499,804 B2 | 3/2009 | Svendsen et al. |
| 7,505,848 B2 | 3/2009 | Flann et al. |
| 7,539,557 B2 | 5/2009 | Yamauchi |
| 7,568,873 B1 | 8/2009 | Rambo |
| 7,574,282 B2 | 8/2009 | Petersson et al. |
| 7,577,499 B2 | 8/2009 | Sun et al. |
| 7,587,260 B2 | 9/2009 | Bruemmer et al. |
| 7,590,413 B2 | 9/2009 | May |
| 7,596,934 B2 | 10/2009 | Waesche et al. |
| 7,610,122 B2 | 10/2009 | Anderson |
| 7,610,123 B2 | 10/2009 | Han et al. |
| 7,613,543 B2 | 11/2009 | Petersson et al. |
| 7,614,835 B2 | 11/2009 | Kitamura |
| 7,617,890 B2 | 11/2009 | Romig |
| 7,647,144 B2 | 1/2010 | Haegermarck |
| D610,072 S | 2/2010 | Wallet et al. |

(56) References Cited

U.S. PATENT DOCUMENTS

| | | |
|---|---|---|
| 7,663,333 B2 | 2/2010 | Jones et al. |
| 7,688,676 B2 | 3/2010 | Chiappetta et al. |
| 7,690,066 B2 | 4/2010 | Stoltz et al. |
| D615,920 S | 5/2010 | Kline et al. |
| 7,707,812 B2 | 5/2010 | Cheung |
| 7,720,572 B2 | 5/2010 | Ziegler et al. |
| 7,729,801 B2 | 6/2010 | Abramson |
| 7,730,705 B2 | 6/2010 | Kubinski |
| 7,769,490 B2 | 8/2010 | Abramson et al. |
| 7,787,989 B2 | 8/2010 | Colens |
| 7,792,607 B2 | 9/2010 | Han et al. |
| 7,801,645 B2 | 9/2010 | Taylor et al. |
| 7,805,220 B2 | 9/2010 | Taylor et al. |
| 7,805,676 B2 | 9/2010 | Schemers et al. |
| 7,805,918 B2 | 10/2010 | Silbernagel et al. |
| D628,145 S | 11/2010 | Vaidya |
| 7,840,210 B2 | 11/2010 | May |
| 7,843,431 B2 | 11/2010 | Robbins et al. |
| 7,844,396 B2 | 11/2010 | Zeitzew |
| 7,853,373 B2 | 12/2010 | Traster et al. |
| 7,876,927 B2 | 1/2011 | Han et al. |
| 7,885,738 B2 | 2/2011 | Park et al. |
| 7,908,834 B2 | 3/2011 | Keski-Luopa |
| 7,929,504 B2 | 4/2011 | Wentink et al. |
| 7,953,526 B2 | 5/2011 | Durkos et al. |
| 7,957,837 B2 | 6/2011 | Ziegler et al. |
| 7,957,850 B2 | 6/2011 | Anderson |
| 7,958,709 B2 | 6/2011 | Coleman et al. |
| 7,958,712 B2 | 6/2011 | Cheung |
| 7,979,175 B2 | 7/2011 | Allard et al. |
| 7,992,251 B2 | 8/2011 | Chung et al. |
| 8,020,657 B2 | 9/2011 | Allard et al. |
| 8,022,667 B2 | 9/2011 | Anderson |
| 8,031,086 B2 | 10/2011 | Thacher et al. |
| 8,046,103 B2 | 10/2011 | Abramson et al. |
| 8,065,866 B2 | 11/2011 | Tamas et al. |
| 8,078,338 B2 | 12/2011 | Pack et al. |
| 8,079,433 B2 | 12/2011 | Teague et al. |
| D652,431 S | 1/2012 | Näslund |
| 8,091,105 B2 | 1/2012 | Lee |
| 8,106,626 B2 | 1/2012 | Li et al. |
| 8,107,318 B2 | 1/2012 | Chiappetta et al. |
| 8,108,092 B2 | 1/2012 | Phillips et al. |
| 8,121,730 B2 | 2/2012 | Sung et al. |
| D656,163 S | 3/2012 | Johansson et al. |
| 8,135,498 B2 | 3/2012 | Hyung et al. |
| 8,150,574 B2 | 4/2012 | Han et al. |
| 8,195,333 B2 | 6/2012 | Ziegler et al. |
| 8,195,342 B2 | 6/2012 | Anderson |
| 8,195,358 B2 | 6/2012 | Anderson |
| 8,199,109 B2 | 6/2012 | Robbins et al. |
| 8,200,428 B2 | 6/2012 | Anderson |
| 8,208,907 B2 | 6/2012 | May |
| 8,209,053 B2 | 6/2012 | Kim et al. |
| 8,224,500 B2 | 7/2012 | Anderson |
| 8,224,516 B2 | 7/2012 | Anderson |
| 8,229,618 B2 | 7/2012 | Tolstedt et al. |
| 8,234,010 B2 | 7/2012 | Thompson et al. |
| 8,234,848 B2 | 8/2012 | Messina et al. |
| 8,237,389 B2 | 8/2012 | Fitch et al. |
| 8,239,992 B2 | 8/2012 | Schnittman et al. |
| 8,255,092 B2 | 8/2012 | Phillips et al. |
| 8,271,132 B2 | 9/2012 | Nielsen et al. |
| 8,292,007 B2 | 10/2012 | DeFazio et al. |
| 8,295,125 B2 | 10/2012 | Chiappetta et al. |
| 8,295,979 B2 | 10/2012 | Thacher et al. |
| 8,297,032 B2 | 10/2012 | Ninomiya et al. |
| 8,297,903 B2 | 10/2012 | Hohmann et al. |
| 8,306,659 B2 | 11/2012 | Abramson et al. |
| 8,311,674 B2 | 11/2012 | Abramson |
| 8,326,469 B2 | 12/2012 | Phillips et al. |
| 8,336,282 B2 | 12/2012 | Messina et al. |
| 8,340,438 B2 | 12/2012 | Anderson |
| 8,347,444 B2 | 1/2013 | Schnittman et al. |
| 8,350,810 B2 | 1/2013 | Robbins et al. |
| 8,352,113 B2 | 1/2013 | Johnson et al. |
| 8,370,985 B2 | 2/2013 | Schnittman et al. |
| 8,390,251 B2 | 3/2013 | Cohen et al. |
| 8,392,044 B2 | 3/2013 | Thompson et al. |
| 8,392,065 B2 | 3/2013 | Tolstedt et al. |
| 8,396,592 B2 | 3/2013 | Jones et al. |
| 8,396,597 B2 | 3/2013 | Anderson |
| 8,396,611 B2 | 3/2013 | Phillips et al. |
| D679,294 S | 4/2013 | Tajik et al. |
| D679,295 S | 4/2013 | Tajik et al. |
| 8,412,377 B2 | 4/2013 | Casey et al. |
| 8,428,776 B2 | 4/2013 | Letsky |
| 8,433,468 B2 | 4/2013 | Johnson et al. |
| 8,438,695 B2 | 5/2013 | Gilbert, Jr. et al. |
| 8,442,700 B2 | 5/2013 | Anderson |
| 8,447,440 B2 | 5/2013 | Phillips et al. |
| 8,447,454 B2 | 5/2013 | Biber et al. |
| 8,461,803 B2 | 6/2013 | Cohen et al. |
| 8,463,438 B2 | 6/2013 | Jones et al. |
| 8,467,928 B2 | 6/2013 | Anderson |
| 8,471,133 B1 | 6/2013 | Lin |
| 8,473,187 B2 | 6/2013 | Kammel et al. |
| 8,476,867 B2 | 7/2013 | Li et al. |
| 8,478,442 B2 | 7/2013 | Casey et al. |
| 8,498,788 B2 | 7/2013 | Kondekar |
| D688,276 S | 8/2013 | Näslund |
| 8,508,329 B2 | 8/2013 | Veenstra |
| 8,521,329 B2 | 8/2013 | Park et al. |
| 8,532,821 B2 | 9/2013 | Ko |
| 8,532,822 B2 | 9/2013 | Abramson et al. |
| 8,560,145 B2 | 10/2013 | Anderson |
| 8,565,920 B2 | 10/2013 | Casey et al. |
| 8,572,266 B2 | 10/2013 | Larocca |
| 8,577,517 B2 | 11/2013 | Phillips et al. |
| 8,577,538 B2 | 11/2013 | Lenser et al. |
| 8,594,842 B2 | 11/2013 | Abramson |
| 8,599,645 B2 | 12/2013 | Chiappetta et al. |
| 8,619,141 B2 | 12/2013 | Anderson |
| 8,634,960 B2 | 1/2014 | Sandin et al. |
| 8,635,015 B2 | 1/2014 | Anderson |
| 8,655,539 B2 | 2/2014 | Yoo et al. |
| 8,660,879 B2 | 2/2014 | Machtelinck |
| 8,666,550 B2 | 3/2014 | Anderson et al. |
| 8,666,554 B2 | 3/2014 | Anderson |
| 8,666,587 B2 | 3/2014 | Anderson |
| 8,671,656 B2 | 3/2014 | Paden |
| 8,676,378 B2 | 3/2014 | Tian et al. |
| 8,706,339 B2 | 4/2014 | Thompson et al. |
| 8,712,623 B2 | 4/2014 | Sato et al. |
| 8,725,316 B2 | 5/2014 | Thompson et al. |
| 8,726,454 B2 | 5/2014 | Gilbert, Jr. et al. |
| 8,731,295 B2 | 5/2014 | Schepelmann et al. |
| 8,739,057 B2 | 5/2014 | Cheong et al. |
| 8,744,626 B2 | 6/2014 | Johnson et al. |
| 8,744,663 B2 | 6/2014 | Sato et al. |
| 8,749,196 B2 | 6/2014 | Cohen et al. |
| 8,760,397 B2 | 6/2014 | Robbins et al. |
| 8,761,935 B2 | 6/2014 | Casey et al. |
| 8,781,627 B2 | 7/2014 | Sandin et al. |
| 8,788,092 B2 | 7/2014 | Casey et al. |
| 8,818,567 B2 | 8/2014 | Anderson |
| 8,818,602 B2 | 8/2014 | Yamamura et al. |
| 8,838,274 B2 | 9/2014 | Jones et al. |
| 8,838,291 B2 | 9/2014 | Jägenstedt et al. |
| 8,839,477 B2 | 9/2014 | Schnittman et al. |
| 8,843,244 B2 | 9/2014 | Phillips et al. |
| 8,854,001 B2 | 10/2014 | Cohen et al. |
| 8,856,150 B2 | 10/2014 | Machtelinck |
| 8,868,237 B2 | 10/2014 | Sandin et al. |
| 8,869,337 B2 | 10/2014 | Sumonthee |
| 8,869,369 B1 | 10/2014 | Roach |
| 8,874,269 B2 | 10/2014 | Biber et al. |
| 8,874,300 B2 | 10/2014 | Allard et al. |
| D718,339 S | 11/2014 | Damshak et al. |
| D718,340 S | 11/2014 | Damshak et al. |
| D718,341 S | 11/2014 | Gur et al. |
| 8,892,352 B2 | 11/2014 | Petereit et al. |
| D718,793 S | 12/2014 | Gur et al. |
| 8,911,192 B2 | 12/2014 | Hohmann et al. |

(56) References Cited

U.S. PATENT DOCUMENTS

| | | |
|---|---|---|
| 8,918,241 B2 | 12/2014 | Chen et al. |
| 8,925,667 B2 | 1/2015 | Chen |
| 8,930,023 B2 | 1/2015 | Gutmann et al. |
| 8,930,024 B2 | 1/2015 | Abramson |
| 8,938,318 B2 | 1/2015 | Bergström et al. |
| 8,942,862 B2 | 1/2015 | Markusson et al. |
| 8,954,193 B2 | 2/2015 | Sandin et al. |
| 8,958,911 B2 | 2/2015 | Wong et al. |
| 8,958,939 B2 | 2/2015 | Einecke et al. |
| 8,965,578 B2 | 2/2015 | Versteeg et al. |
| 8,989,946 B2 | 3/2015 | Anderson |
| 8,989,972 B2 | 3/2015 | Anderson |
| 8,996,171 B2 | 3/2015 | Anderson et al. |
| 8,996,177 B2 | 3/2015 | Coenen |
| D729,280 S | 5/2015 | Näslund et al. |
| 9,021,777 B2 | 5/2015 | Johnson et al. |
| 9,026,299 B2 | 5/2015 | Johnson et al. |
| 9,026,302 B2 | 5/2015 | Stout et al. |
| 9,031,050 B2 | 5/2015 | Cherian et al. |
| 9,037,294 B2 | 5/2015 | Chung et al. |
| 9,043,016 B2 | 5/2015 | Filippov et al. |
| 9,043,129 B2 | 5/2015 | Bonefas et al. |
| D731,402 S | 6/2015 | Tedesco et al. |
| 9,043,952 B2 | 6/2015 | Sandin et al. |
| 9,043,953 B2 | 6/2015 | Sandin et al. |
| 9,072,218 B2 | 7/2015 | Johnson et al. |
| 9,072,219 B2 | 7/2015 | Da Rocha et al. |
| 9,079,303 B2 | 7/2015 | Abramson et al. |
| 9,093,868 B2 | 7/2015 | Baxter |
| 9,104,204 B2 | 8/2015 | Jones et al. |
| 9,104,206 B2 | 8/2015 | Biber et al. |
| 9,110,471 B2 | 8/2015 | Pack et al. |
| 9,113,595 B2 | 8/2015 | Roth et al. |
| 9,119,341 B2 | 9/2015 | Jägenstedt |
| 9,137,943 B2 | 9/2015 | Einecke et al. |
| 9,144,193 B2 | 9/2015 | Paden |
| 9,182,763 B2 | 11/2015 | Park et al. |
| 9,186,800 B2 | 11/2015 | Shin et al. |
| 9,188,980 B2 | 11/2015 | Anderson |
| 9,188,983 B2 | 11/2015 | Stout et al. |
| 9,195,256 B2 | 11/2015 | Robbins et al. |
| D745,897 S | 12/2015 | Mehra et al. |
| 9,213,934 B1 | 12/2015 | Versteeg et al. |
| 9,215,957 B2 | 12/2015 | Cohen et al. |
| 9,223,312 B2 | 12/2015 | Goel et al. |
| 9,232,692 B2 | 1/2016 | Björn et al. |
| 9,235,214 B2 | 1/2016 | Anderson |
| 9,236,637 B2 | 1/2016 | Anderson |
| 9,241,441 B2 | 1/2016 | Björn et al. |
| D748,568 S | 2/2016 | Helin et al. |
| 9,258,942 B2 | 2/2016 | Biber et al. |
| 9,268,331 B2 | 2/2016 | Abramson et al. |
| 9,276,419 B2 | 3/2016 | Borinato et al. |
| 9,278,690 B2 | 3/2016 | Smith |
| 9,301,444 B2 | 4/2016 | Campbell et al. |
| D757,637 S | 5/2016 | Horowitz |
| 9,327,407 B2 | 5/2016 | Jones et al. |
| 9,335,767 B2 | 5/2016 | Jang et al. |
| 9,338,130 B2 | 5/2016 | Von Huben et al. |
| 9,348,897 B2 | 5/2016 | Shoham et al. |
| 9,349,187 B2 | 5/2016 | Schepelmann et al. |
| D758,455 S | 6/2016 | Maibach et al. |
| D759,577 S | 6/2016 | Wang et al. |
| 9,357,699 B2 | 6/2016 | Elonsson |
| 9,363,945 B2 | 6/2016 | Jägenstedt et al. |
| 9,375,842 B2 | 6/2016 | Shamlian et al. |
| 9,376,027 B2 | 6/2016 | Harris |
| D760,806 S | 7/2016 | Cmich et al. |
| 9,380,742 B2 | 7/2016 | Biber et al. |
| 9,405,294 B2 | 8/2016 | Jägenstedt et al. |
| 9,412,515 B2 | 8/2016 | Hyde et al. |
| 9,419,453 B2 | 8/2016 | Andersson et al. |
| 9,420,741 B2 | 8/2016 | Balutis et al. |
| 9,421,879 B2 | 8/2016 | Pastoor et al. |
| 9,426,946 B2 | 8/2016 | Fisher |
| 9,429,950 B2 | 8/2016 | Sjöholm |
| 9,436,185 B2 | 9/2016 | Schnittman |
| 9,439,348 B2 | 9/2016 | Biber et al. |
| 9,439,367 B2 | 9/2016 | Abhyanker |
| 9,440,350 B2 | 9/2016 | Mou et al. |
| 9,440,354 B2 | 9/2016 | Gutmann et al. |
| 9,446,521 B2 | 9/2016 | Casey et al. |
| 9,452,525 B2 | 9/2016 | Ziegler et al. |
| 9,452,685 B2 | 9/2016 | Hyde et al. |
| D769,180 S | 10/2016 | Wang et al. |
| 9,456,545 B2 | 10/2016 | Biber |
| 9,457,677 B2 | 10/2016 | Hyde et al. |
| 9,463,704 B2 | 10/2016 | Hyde et al. |
| 9,471,063 B2 | 10/2016 | Ouyang |
| 9,480,201 B2 | 11/2016 | Maruyama et al. |
| 9,483,055 B2 | 11/2016 | Johnson et al. |
| 9,491,904 B2 | 11/2016 | Jägenstedt et al. |
| 9,497,901 B2 | 11/2016 | Willgert |
| 9,505,140 B1 | 11/2016 | Fay et al. |
| 9,510,505 B2 | 12/2016 | Halloran et al. |
| 9,516,806 B2 | 12/2016 | Yamauchi et al. |
| D776,169 S | 1/2017 | Cmich et al. |
| 9,532,688 B1 | 1/2017 | Ebrahimi Afrouzi et al. |
| 9,538,702 B2 | 1/2017 | Balutis et al. |
| 9,543,680 B2 | 1/2017 | Elonsson |
| 9,545,032 B2 | 1/2017 | Baer et al. |
| 9,550,294 B2 | 1/2017 | Cohen et al. |
| 9,554,508 B2 | 1/2017 | Balutis et al. |
| 9,559,461 B1 | 1/2017 | Diehr |
| 9,560,800 B2 | 2/2017 | Reichen et al. |
| 9,563,204 B2 | 2/2017 | Willgert |
| 9,573,275 B2 | 2/2017 | Reigo et al. |
| D781,349 S | 3/2017 | Cmich |
| D781,926 S | 3/2017 | Al-Hashimi et al. |
| 9,586,563 B2 | 3/2017 | Kanai et al. |
| 9,590,862 B2 | 3/2017 | Larocca |
| 9,606,541 B2 | 3/2017 | Abramson |
| 9,622,399 B2 | 4/2017 | Kremmer et al. |
| 9,623,557 B2 | 4/2017 | Gutmann et al. |
| 9,630,319 B2 | 4/2017 | Vicenti |
| 9,632,489 B2 | 4/2017 | Biber et al. |
| 9,699,964 B2 | 7/2017 | Roth et al. |
| 9,701,020 B1 | 7/2017 | Ebrahimi Afrouzi |
| 9,711,767 B2 | 7/2017 | Juenger et al. |
| 9,713,302 B2 | 7/2017 | Sandin et al. |
| 9,713,303 B2 | 7/2017 | Jägenstedt et al. |
| D794,089 S | 8/2017 | Maibach et al. |
| 9,717,175 B2 | 8/2017 | Fay, II et al. |
| 9,720,417 B2 | 8/2017 | Reigo et al. |
| 9,723,782 B2 | 8/2017 | Roth et al. |
| 9,736,981 B2 | 8/2017 | Roth et al. |
| 9,740,210 B2 | 8/2017 | Sjöholm |
| D796,555 S | 9/2017 | Landberg et al. |
| D797,530 S | 9/2017 | Cmich |
| 9,750,183 B2 | 9/2017 | Haun |
| 9,766,627 B2 | 9/2017 | Jägenstedt et al. |
| D799,555 S | 10/2017 | Cmich |
| 9,785,148 B2 | 10/2017 | Yun |
| 9,788,481 B2 | 10/2017 | Das et al. |
| 9,788,483 B2 | 10/2017 | Roth et al. |
| 9,791,860 B2 | 10/2017 | Phillips et al. |
| 9,804,604 B2 | 10/2017 | Mattsson et al. |
| 9,807,925 B2 | 11/2017 | Johnson |
| 9,807,930 B1 | 11/2017 | Lydon et al. |
| 9,817,398 B2 | 11/2017 | Yamamura et al. |
| 9,820,433 B2 | 11/2017 | Borinato |
| 9,826,678 B2 | 11/2017 | Balutis et al. |
| 9,829,891 B2 | 11/2017 | Smith et al. |
| 9,841,768 B2 | 12/2017 | Hiramatsu et al. |
| 9,844,876 B2 | 12/2017 | Chung et al. |
| 9,848,529 B2 | 12/2017 | Franzius et al. |
| 9,848,532 B2 | 12/2017 | Keski-Luopa et al. |
| 9,851,718 B2 | 12/2017 | Booher |
| 9,853,468 B2 | 12/2017 | Ireland |
| D807,281 S | 1/2018 | Irwin et al. |
| D807,811 S | 1/2018 | Wang et al. |
| 9,854,737 B2 | 1/2018 | Yamauchi et al. |
| 9,854,956 B2 | 1/2018 | Song et al. |
| 9,857,025 B2 | 1/2018 | Gottinger et al. |

(56) References Cited

U.S. PATENT DOCUMENTS

| | | | |
|---|---|---|---|
| 9,861,035 B2 | 1/2018 | Kruckeberg et al. |
| 9,872,437 B2 | 1/2018 | Markusson et al. |
| 9,874,876 B2 | 1/2018 | Shimamura |
| 9,876,370 B2 | 1/2018 | Yamamura et al. |
| D810,664 S | 2/2018 | Sgreccia et al. |
| D810,665 S | 2/2018 | Sgreccia et al. |
| 9,884,423 B2 | 2/2018 | Cohen et al. |
| 9,894,836 B2 | 2/2018 | Garton |
| 9,895,808 B2 | 2/2018 | Stout et al. |
| 9,901,028 B2 | 2/2018 | Hans |
| 9,903,947 B2 | 2/2018 | Das et al. |
| 9,924,632 B2 | 3/2018 | Chenevert et al. |
| 9,924,847 B2 | 3/2018 | Gottinger et al. |
| 9,931,007 B2 | 4/2018 | Morin et al. |
| 9,931,008 B2 | 4/2018 | Yoo et al. |
| 9,931,750 B2 | 4/2018 | Cohen et al. |
| 9,936,635 B2 | 4/2018 | Gottinger et al. |
| 9,968,024 B2 | 5/2018 | Haneda et al. |
| 9,972,098 B1 | 5/2018 | Ebrahimi Afrouzi et al. |
| 9,983,586 B2 | 5/2018 | Borinato |
| 10,011,180 B2 | 7/2018 | Hyde et al. |
| 10,021,830 B2 | 7/2018 | Doughty |
| 10,024,964 B2 | 7/2018 | Pierce et al. |
| 10,029,368 B2 | 7/2018 | Wolowelsky et al. |
| 10,031,527 B2 | 7/2018 | Björn |
| 10,034,421 B2 | 7/2018 | Doughty et al. |
| 10,035,270 B2 | 7/2018 | Fay et al. |
| 10,037,038 B2 | 7/2018 | Sandin et al. |
| 10,046,130 B2 | 8/2018 | Molden et al. |
| 10,054,924 B2 | 8/2018 | Willgert |
| 10,057,813 B1 | 8/2018 | Likar et al. |
| 10,067,232 B2 | 9/2018 | Halloran et al. |
| 10,070,764 B2 | 9/2018 | Schnittman et al. |
| 10,071,475 B2 | 9/2018 | Lin et al. |
| 10,078,336 B2 | 9/2018 | Reigo et al. |
| 10,080,326 B2 | 9/2018 | Yamamura et al. |
| D830,418 S | 10/2018 | Näslund et al. |
| 10,091,930 B2 | 10/2018 | Balutis et al. |
| 10,093,194 B2 | 10/2018 | Hyde et al. |
| 10,093,259 B2 | 10/2018 | Pan |
| 10,098,277 B2 | 10/2018 | Ouyang |
| 10,104,835 B2 | 10/2018 | Köhler et al. |
| 10,105,838 B2 | 10/2018 | Mou et al. |
| 10,108,198 B2 | 10/2018 | Björn et al. |
| D834,185 S | 11/2018 | Molden et al. |
| D834,504 S | 11/2018 | Ropars |
| D834,505 S | 11/2018 | Wang et al. |
| 10,117,379 B2 | 11/2018 | Guiet et al. |
| 10,123,479 B2 | 11/2018 | Ladd, Jr. et al. |
| 10,124,494 B2 | 11/2018 | Outa et al. |
| 10,131,057 B2 | 11/2018 | Patel et al. |
| 10,136,576 B2 | 11/2018 | Reigo |
| 10,149,430 B2 | 12/2018 | Bergström et al. |
| 10,152,062 B2 | 12/2018 | Schnittman |
| 10,157,334 B2 | 12/2018 | Schepelmann et al. |
| 10,159,180 B2 | 12/2018 | Balutis et al. |
| 10,162,359 B2 | 12/2018 | Johnson et al. |
| D837,150 S | 1/2019 | Näslund et al. |
| 10,165,725 B2 | 1/2019 | Sugumaran et al. |
| 10,172,282 B2 | 1/2019 | Svensson et al. |
| 10,178,826 B2 | 1/2019 | Jägenstedt et al. |
| 10,183,400 B2 | 1/2019 | Trigui et al. |
| 10,183,701 B2 | 1/2019 | Ebrahimi Afrouzi et al. |
| 10,185,325 B2 | 1/2019 | Reigo et al. |
| 10,201,261 B2 | 2/2019 | Tanaka et al. |
| 10,207,557 B2 | 2/2019 | Björn et al. |
| 10,212,880 B2 | 2/2019 | Cmich et al. |
| 10,238,026 B2 | 3/2019 | Köhler et al. |
| D845,877 S | 4/2019 | Geng et al. |
| 10,244,678 B2 | 4/2019 | Lydon et al. |
| 10,246,907 B2 | 4/2019 | Shen |
| 10,257,976 B2 | 4/2019 | Ladd, Jr. et al. |
| 10,259,498 B2 | 4/2019 | Jägenstedt et al. |
| 10,268,206 B2 | 4/2019 | Yamamura |
| 10,274,954 B2 | 4/2019 | Balutis et al. |
| D848,488 S | 5/2019 | Cmich |
| 10,281,912 B2 | 5/2019 | Hollister |
| 10,281,922 B2 | 5/2019 | Smith et al. |
| 10,299,431 B2 | 5/2019 | Ladd, Jr. et al. |
| 10,299,652 B2 | 5/2019 | Gilbert, Jr. et al. |
| D852,232 S | 6/2019 | Eidson et al. |
| 10,310,510 B2 | 6/2019 | Mannefred et al. |
| 10,315,306 B2 | 6/2019 | Abramson |
| 10,321,625 B2 | 6/2019 | Einecke et al. |
| 10,327,384 B2 | 6/2019 | Johansson et al. |
| D853,447 S | 7/2019 | Mehra et al. |
| D853,448 S | 7/2019 | Mehra et al. |
| D853,449 S | 7/2019 | Mehra et al. |
| 10,338,602 B2 | 7/2019 | Grufman et al. |
| 10,343,280 B1 | 7/2019 | Ebrahimi Afrouzi |
| 10,346,995 B1 | 7/2019 | Ebrahimi Afrouzi |
| 10,353,399 B2 | 7/2019 | Ebrahimi Afrouzi |
| 10,362,730 B2 | 7/2019 | Ladd, Jr. et al. |
| 10,365,661 B2 | 7/2019 | Jägenstedt et al. |
| 10,369,705 B2 | 8/2019 | Trigui et al. |
| 10,372,140 B2 | 8/2019 | Sun et al. |
| 10,375,880 B2 | 8/2019 | Morin et al. |
| 10,377,035 B2 | 8/2019 | He et al. |
| 10,379,172 B2 | 8/2019 | Kleiner et al. |
| 10,384,346 B2 | 8/2019 | Hickman et al. |
| 10,386,844 B2 | 8/2019 | Wilcox et al. |
| 10,390,483 B2 | 8/2019 | Balutis et al. |
| D858,424 S | 9/2019 | Chattopadhyay |
| 10,405,488 B2 | 9/2019 | Kamfors et al. |
| 10,425,488 B2 | 9/2019 | Larsén et al. |
| D864,256 S | 10/2019 | Eidson et al. |
| 10,426,083 B2 | 10/2019 | Doughty |
| 10,440,879 B2 | 10/2019 | Björn et al. |
| 10,442,083 B2 | 10/2019 | Wolowelsky et al. |
| 10,444,756 B2 | 10/2019 | Kamfors et al. |
| 10,444,757 B2 | 10/2019 | Dong et al. |
| 10,444,760 B2 | 10/2019 | Grufman et al. |
| 10,448,565 B2 | 10/2019 | Mannefred et al. |
| 10,454,287 B2 | 10/2019 | Yamamura et al. |
| 10,456,924 B2 | 10/2019 | Outa et al. |
| 10,459,452 B2 | 10/2019 | Eagling et al. |
| 10,462,961 B2 | 11/2019 | Tjernberg et al. |
| 10,463,215 B2 | 11/2019 | Morin et al. |
| 10,464,206 B2 | 11/2019 | Frisby et al. |
| 10,466,710 B2 | 11/2019 | Biber et al. |
| 10,485,164 B2 | 11/2019 | Letsky |
| 10,488,865 B2 | 11/2019 | Afrouzi et al. |
| 10,496,262 B1 | 12/2019 | Ebrahimi Afrouzi et al. |
| 10,500,722 B2 | 12/2019 | Vicenti |
| 10,514,701 B2 | 12/2019 | Windorfer |
| 10,517,211 B2 | 12/2019 | Öhrlund et al. |
| 10,518,651 B2 | 12/2019 | Svensson et al. |
| 10,520,113 B1 | 12/2019 | Thompson |
| 10,542,667 B2 | 1/2020 | Song et al. |
| 10,542,670 B2 | 1/2020 | Cmich et al. |
| 10,549,646 B2 | 2/2020 | Reynolds et al. |
| 10,551,844 B2 | 2/2020 | Biber et al. |
| 10,552,770 B2 | 2/2020 | Brough et al. |
| 10,555,456 B2 | 2/2020 | Borinato |
| 10,555,457 B2 | 2/2020 | Song et al. |
| 10,561,063 B2 | 2/2020 | Hasegawa et al. |
| 10,568,258 B2 | 2/2020 | Wahlgren |
| 10,571,905 B2 | 2/2020 | Yamamura |
| 10,571,928 B2 | 2/2020 | Sun et al. |
| 10,575,465 B2 | 3/2020 | Ran et al. |
| 10,575,696 B2 | 3/2020 | O'Brien et al. |
| 10,583,562 B2 | 3/2020 | Stout et al. |
| 10,588,255 B2 | 3/2020 | Song et al. |
| 10,589,418 B2 | 3/2020 | Gordon-Carroll et al. |
| 10,589,432 B2 | 3/2020 | Al Nahwi et al. |
| 10,589,433 B2 | 3/2020 | Al Nahwi et al. |
| 10,592,998 B2 | 3/2020 | Eijdenberg et al. |
| 10,594,117 B2 | 3/2020 | Song et al. |
| 10,595,459 B2 | 3/2020 | Aposhian et al. |
| 10,595,692 B2 | 3/2020 | Morin et al. |
| 10,598,793 B2 | 3/2020 | Öhrlund et al. |
| 10,599,154 B2 | 3/2020 | Dean et al. |
| 10,606,275 B2 | 3/2020 | Dean et al. |
| 10,606,279 B2 | 3/2020 | Grufman et al. |

(56) References Cited

U.S. PATENT DOCUMENTS

| | | |
|---|---|---|
| D880,532 S | 4/2020 | Gunnarsson et al. |
| D881,252 S | 4/2020 | Vestberg et al. |
| D882,640 S | 4/2020 | Estey |
| 10,609,862 B2 | 4/2020 | Wu et al. |
| 10,611,028 B1 | 4/2020 | Zhou et al. |
| 10,612,929 B2 | 4/2020 | Afrouzi et al. |
| 10,613,541 B1 | 4/2020 | Ebrahimi Afrouzi et al. |
| 10,621,537 B2 | 4/2020 | Ben-Alexander |
| D884,762 S | 5/2020 | Gunnarsson et al. |
| D884,763 S | 5/2020 | Gunnarsson et al. |
| 10,643,377 B2 | 5/2020 | Grufman et al. |
| 10,646,997 B2 | 5/2020 | Reigo et al. |
| 10,649,466 B2 | 5/2020 | Holmström et al. |
| 10,651,594 B1 | 5/2020 | Tsai et al. |
| 10,653,057 B2 | 5/2020 | Choi et al. |
| 10,653,058 B2 | 5/2020 | Yamanaka et al. |
| 10,653,282 B2 | 5/2020 | Song et al. |
| 10,656,652 B2 | 5/2020 | Dean et al. |
| D887,464 S | 6/2020 | Gunnarsson et al. |
| D887,465 S | 6/2020 | Gunnarsson et al. |
| D887,466 S | 6/2020 | Gunnarsson et al. |
| 10,670,406 B2 | 6/2020 | Eguchi et al. |
| 10,673,630 B2 | 6/2020 | Pakkan et al. |
| 10,674,659 B2 | 6/2020 | Ladd, Jr. et al. |
| 10,674,660 B2 | 6/2020 | Matsuzawa et al. |
| 10,681,863 B2 | 6/2020 | Hans et al. |
| 10,681,864 B2 | 6/2020 | Matt et al. |
| 10,691,000 B2 | 6/2020 | Du et al. |
| 10,698,417 B2 | 6/2020 | Churavy et al. |
| D889,517 S | 7/2020 | Prybor et al. |
| 10,716,258 B2 | 7/2020 | Pellenc et al. |
| 10,721,860 B2 | 7/2020 | Liljedahl |
| D892,187 S | 8/2020 | Maggard |
| 10,737,369 B2 | 8/2020 | Steinhauser et al. |
| 10,737,395 B2 | 8/2020 | Wolff et al. |
| 10,738,495 B2 | 8/2020 | Durvasula et al. |
| 10,739,769 B2 | 8/2020 | Dean et al. |
| 10,747,413 B2 | 8/2020 | Schneider et al. |
| 10,750,667 B2 | 8/2020 | Yamauchi et al. |
| 10,750,918 B2 | 8/2020 | Jung et al. |
| D896,737 S | 9/2020 | Phely |
| 10,758,100 B2 | 9/2020 | Cohen et al. |
| 10,765,284 B2 | 9/2020 | Song et al. |
| 10,766,147 B2 | 9/2020 | Trigui et al. |
| 10,777,000 B2 | 9/2020 | Grufman et al. |
| 10,782,705 B2 | 9/2020 | Reigo et al. |
| 10,785,907 B2 | 9/2020 | Doughty et al. |
| 10,788,832 B2 | 9/2020 | Nykamp |
| 10,791,684 B2 | 10/2020 | He et al. |
| 10,795,377 B2 | 10/2020 | Afrouzi et al. |
| 10,806,075 B2 | 10/2020 | Grufman et al. |
| 10,809,071 B2 | 10/2020 | Afrouzi et al. |
| 10,809,740 B2 | 10/2020 | Reinert et al. |
| 10,814,495 B2 | 10/2020 | Patel et al. |
| 10,820,493 B2 | 11/2020 | Ritzer et al. |
| 10,824,163 B2 | 11/2020 | Einecke et al. |
| 10,842,074 B2 | 11/2020 | Jägenstedt et al. |
| 10,843,734 B1 | 11/2020 | Ebrahimi Afrouzi et al. |
| 10,843,735 B1 | 11/2020 | Ebrahimi Afrouzi et al. |
| 10,845,481 B2 | 11/2020 | Pierce et al. |
| 10,845,804 B2 | 11/2020 | Holgersson et al. |
| D906,373 S | 12/2020 | Morin et al. |
| 10,849,267 B2 | 12/2020 | Strandberg et al. |
| 10,849,270 B2 | 12/2020 | Johansson et al. |
| 10,850,400 B2 | 12/2020 | Park |
| 10,852,735 B2 | 12/2020 | Tan et al. |
| 10,852,738 B2 | 12/2020 | Mannefred et al. |
| 10,856,467 B2 | 12/2020 | Maggard |
| 10,858,041 B2 | 12/2020 | Jägenstedt et al. |
| 10,869,432 B2 | 12/2020 | Wykman et al. |
| 10,873,194 B2 | 12/2020 | Lydon et al. |
| 10,874,045 B2 | 12/2020 | Balutis et al. |
| 10,874,049 B2 | 12/2020 | Ladd, Jr. et al. |
| 10,874,051 B2 | 12/2020 | Kasai et al. |
| 10,874,278 B2 | 12/2020 | Matt et al. |
| D908,597 S | 1/2021 | Meng et al. |
| D908,598 S | 1/2021 | Meng et al. |
| 10,882,187 B2 | 1/2021 | Li et al. |
| 10,888,046 B2 | 1/2021 | Gorenflo et al. |
| 10,890,921 B2 | 1/2021 | Gillett |
| 10,895,876 B2 | 1/2021 | Arenz et al. |
| 10,899,171 B2 | 1/2021 | Cmich |
| 10,912,253 B2 | 2/2021 | Einecke et al. |
| 10,928,833 B2 | 2/2021 | Reigo |
| 10,932,409 B2 | 3/2021 | Ingvalson et al. |
| 10,935,383 B1 | 3/2021 | Ebrahimi Afrouzi et al. |
| 10,939,611 B2 | 3/2021 | Liljedahl |
| 10,952,578 B2 | 3/2021 | Gill et al. |
| 10,959,371 B2 | 3/2021 | Zhou et al. |
| 10,966,368 B2 | 4/2021 | Desai et al. |
| 10,967,752 B2 | 4/2021 | Liu et al. |
| 10,973,168 B2 | 4/2021 | Hans et al. |
| 10,986,775 B2 | 4/2021 | Matt et al. |
| 10,986,971 B1 | 4/2021 | Ebrahimi Afrouzi |
| 10,993,598 B2 | 5/2021 | Park et al. |
| 11,003,192 B2 | 5/2021 | Dalfra et al. |
| 11,009,869 B2 | 5/2021 | Moroi et al. |
| 11,013,655 B1 | 5/2021 | Ebrahimi Afrouzi et al. |
| 11,014,460 B2 | 5/2021 | Schnittman et al. |
| 11,016,481 B2 | 5/2021 | Gustavsson et al. |
| D922,444 S | 6/2021 | Morin et al. |
| 11,019,975 B2 | 6/2021 | Jang et al. |
| 11,020,857 B2 | 6/2021 | Xiong et al. |
| 11,039,582 B2 | 6/2021 | Gilliam et al. |
| 11,039,583 B2 | 6/2021 | Gilliam et al. |
| 11,044,844 B2 | 6/2021 | Keski-luopa et al. |
| 11,048,268 B2 | 6/2021 | Ouyang |
| 11,051,449 B2 | 7/2021 | Bergh et al. |
| 11,051,671 B2 | 7/2021 | Jang et al. |
| 11,052,535 B2 | 7/2021 | Parks, II et al. |
| 11,052,540 B2 | 7/2021 | Stout et al. |
| 11,054,822 B2 | 7/2021 | Özmen |
| 11,054,836 B2 | 7/2021 | Wang et al. |
| 11,058,053 B2 | 7/2021 | Patel et al. |
| 11,064,652 B2 | 7/2021 | Matt et al. |
| 11,065,762 B2 | 7/2021 | Sakai et al. |
| 11,069,082 B1 | 7/2021 | Ebrahimi Afrouzi et al. |
| 11,071,429 B2 | 7/2021 | Jang et al. |
| 11,072,250 B2 | 7/2021 | Gilbert, Jr. et al. |
| 11,072,255 B2 | 7/2021 | Svensson et al. |
| 11,075,910 B2 | 7/2021 | Dean et al. |
| 11,076,529 B2 | 8/2021 | Chen et al. |
| 11,079,755 B2 | 8/2021 | Schlacks, IV et al. |
| 11,084,172 B2 | 8/2021 | Casey et al. |
| 11,089,732 B2 | 8/2021 | Jägenstedt et al. |
| 11,097,428 B2 | 8/2021 | Al Nahwi et al. |
| 11,099,572 B2 | 8/2021 | Cestonaro et al. |
| 11,104,006 B2 | 8/2021 | Fay et al. |
| 11,105,109 B2 | 8/2021 | Durvasula et al. |
| 11,106,215 B2 | 8/2021 | Dalfra |
| 11,109,528 B2 | 9/2021 | Strang |
| 11,109,731 B2 | 9/2021 | Jang et al. |
| 11,112,505 B2 | 9/2021 | Öhrlund et al. |
| 11,112,532 B2 | 9/2021 | Jägenstedt et al. |
| 11,115,798 B2 | 9/2021 | Beaulieu et al. |
| 11,117,264 B2 | 9/2021 | Tsai et al. |
| 11,119,496 B1 | 9/2021 | Ebrahimi Afrouzi et al. |
| 11,126,193 B2 | 9/2021 | Mannefred et al. |
| 11,134,609 B2 | 10/2021 | Willgert et al. |
| 11,140,815 B2 | 10/2021 | Matt et al. |
| 11,140,819 B2 | 10/2021 | Chen et al. |
| 11,141,034 B2 | 10/2021 | Jang et al. |
| 11,154,006 B2 | 10/2021 | Liljedahl |
| 11,154,442 B1 | 10/2021 | Dean et al. |
| 11,157,015 B2 | 10/2021 | Schnittman |
| D937,181 S | 11/2021 | Guidry |
| 11,161,235 B2 | 11/2021 | He et al. |
| 11,161,381 B2 | 11/2021 | Svensson et al. |
| 11,161,422 B2 | 11/2021 | Andriolo et al. |
| 11,161,578 B2 | 11/2021 | Wu et al. |
| 11,163,292 B2 | 11/2021 | Adler et al. |
| 11,166,411 B2 | 11/2021 | Fuse et al. |
| 11,169,527 B2 | 11/2021 | Dalfra |
| 11,169,530 B1 | 11/2021 | Ärlig et al. |

(56) References Cited

U.S. PATENT DOCUMENTS

| | | |
|---|---|---|
| 11,171,497 B2 | 11/2021 | Jiao et al. |
| 11,173,594 B2 | 11/2021 | Kim |
| 11,175,374 B2 | 11/2021 | Kameyama et al. |
| 11,191,403 B2 | 12/2021 | Gill et al. |
| 11,197,414 B2 | 12/2021 | Zeiler et al. |
| 11,199,853 B1 | 12/2021 | Afrouzi et al. |
| 11,202,547 B2 | 12/2021 | Jang et al. |
| 11,215,461 B1 | 1/2022 | Ebrahimi Afrouzi et al. |
| 11,221,628 B2 | 1/2022 | Holgersson et al. |
| 11,225,228 B2 | 1/2022 | Liu et al. |
| 11,229,154 B2 | 1/2022 | Hershbarger |
| 11,231,708 B2 | 1/2022 | Hyakusawa |
| D943,638 S | 2/2022 | Rauch et al. |
| 11,235,451 B2 | 2/2022 | Bombulie |
| 11,235,472 B2 | 2/2022 | Al Nahwi et al. |
| 11,253,126 B2 | 2/2022 | Jang et al. |
| 11,260,765 B2 | 3/2022 | Namiki et al. |
| 11,269,349 B2 | 3/2022 | Shao et al. |
| 11,274,929 B1 | 3/2022 | Afrouzi et al. |
| 11,278,176 B2 | 3/2022 | Huang et al. |
| 11,278,177 B2 | 3/2022 | Lin et al. |
| 11,284,766 B2 | 3/2022 | Jang et al. |
| 11,287,821 B2 | 3/2022 | Borinato |
| 11,287,832 B2 | 3/2022 | Ebrahimi Afrouzi |
| 11,291,343 B2 | 4/2022 | Jang et al. |
| 11,292,136 B2 | 4/2022 | Wolff et al. |
| 11,298,831 B2 | 4/2022 | Tsai et al. |
| 11,300,975 B2 | 4/2022 | Dalfra et al. |
| 11,320,828 B1 | 5/2022 | Ebrahimi Afrouzi et al. |
| 11,325,590 B2 | 5/2022 | Han et al. |
| 11,340,079 B1 | 5/2022 | Ebrahimi Afrouzi et al. |
| 11,347,230 B2 | 5/2022 | Wang et al. |
| 11,351,670 B2 | 6/2022 | Wolowelsky et al. |
| 11,357,166 B2 | 6/2022 | Hahn et al. |
| 11,357,167 B2 | 6/2022 | Aposhian et al. |
| 11,378,979 B2 | 7/2022 | Zhou et al. |
| 11,380,320 B2 | 7/2022 | Duncan |
| 11,393,114 B1 | 7/2022 | Ebrahimi Afrouzi et al. |
| 11,415,998 B2 | 8/2022 | Strandberg |
| 11,464,164 B2 | 10/2022 | Cmich et al. |
| 11,596,117 B2 | 3/2023 | Koehler et al. |
| 11,614,744 B2 | 3/2023 | Ran et al. |
| 11,654,574 B2 | 5/2023 | Zhang et al. |
| 11,662,723 B2 | 5/2023 | Schlacks, IV et al. |
| 2002/0005237 A1 | 1/2002 | Musat et al. |
| 2003/0144774 A1 | 7/2003 | Trissel et al. |
| 2003/0218046 A1 | 11/2003 | Mangone, Jr. |
| 2003/0236590 A1 | 12/2003 | Park et al. |
| 2004/0000823 A1 | 1/2004 | Patridge |
| 2004/0158358 A1 | 8/2004 | Anezaki et al. |
| 2004/0187457 A1 | 9/2004 | Colens |
| 2004/0190376 A1 | 9/2004 | Hulden et al. |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0236468 A1 | 11/2004 | Taylor et al. |
| 2004/0244138 A1 | 12/2004 | Taylor et al. |
| 2005/0010331 A1 | 1/2005 | Taylor et al. |
| 2005/0028346 A1 | 2/2005 | Mangone, Jr. |
| 2005/0034437 A1 | 2/2005 | McMurtry et al. |
| 2005/0039428 A1 | 2/2005 | McMurtry et al. |
| 2005/0042059 A1 | 2/2005 | Bremer |
| 2005/0060975 A1 | 3/2005 | McClymonds |
| 2005/0171637 A1 | 8/2005 | Tani et al. |
| 2005/0171644 A1 | 8/2005 | Tani |
| 2005/0273967 A1 | 12/2005 | Taylor et al. |
| 2006/0010844 A1 | 1/2006 | Angott |
| 2006/0020369 A1 | 1/2006 | Taylor et al. |
| 2006/0020370 A1 | 1/2006 | Abramson |
| 2006/0191096 A1 | 8/2006 | Sudo et al. |
| 2006/0212191 A1 | 9/2006 | Saeki |
| 2006/0217854 A1 | 9/2006 | Takenaka et al. |
| 2006/0219838 A1 | 10/2006 | Audet |
| 2007/0100496 A1 | 5/2007 | Forell |
| 2007/0119137 A1 | 5/2007 | Brandon |
| 2007/0142972 A1 | 6/2007 | Abramson et al. |
| 2007/0143949 A1 | 6/2007 | Chiu |
| 2007/0145943 A1 | 6/2007 | Sudo |
| 2007/0150109 A1 | 6/2007 | Peless et al. |
| 2007/0234698 A1 | 10/2007 | Silbernagel et al. |
| 2007/0276541 A1 | 11/2007 | Sawasaki |
| 2008/0143065 A1 | 6/2008 | Defazio et al. |
| 2008/0163117 A1 | 7/2008 | Machtelinck et al. |
| 2008/0167753 A1 | 7/2008 | Peless et al. |
| 2008/0281470 A1 | 11/2008 | Gilbert, Jr. et al. |
| 2008/0294288 A1 | 11/2008 | Yamauchi |
| 2009/0112679 A1 | 4/2009 | Machtelinck |
| 2009/0157259 A1 | 6/2009 | Han et al. |
| 2009/0182464 A1 | 7/2009 | Myeong et al. |
| 2009/0276277 A1 | 11/2009 | Vansteenkiste et al. |
| 2009/0313038 A1 | 12/2009 | Machtelinck |
| 2010/0057286 A1 | 3/2010 | Kerchner |
| 2010/0063652 A1 | 3/2010 | Anderson |
| 2010/0066587 A1 | 3/2010 | Yamauchi et al. |
| 2010/0139995 A1* | 6/2010 | Rudakevych .......... B62D 55/06 180/9.32 |
| 2010/0299016 A1 | 11/2010 | Benzler et al. |
| 2011/0035054 A1* | 2/2011 | Gal ...................... G05D 1/0038 901/1 |
| 2011/0046784 A1 | 2/2011 | Anderson |
| 2011/0046836 A1 | 2/2011 | Anderson |
| 2011/0112713 A1 | 5/2011 | Teng et al. |
| 2011/0153172 A1 | 6/2011 | Anderson |
| 2011/0153338 A1 | 6/2011 | Anderson |
| 2011/0202307 A1 | 8/2011 | Petereit et al. |
| 2011/0208357 A1 | 8/2011 | Yamauchi |
| 2011/0295423 A1 | 12/2011 | Anderson |
| 2012/0012635 A1 | 1/2012 | Jaffe et al. |
| 2012/0029752 A1 | 2/2012 | Johnson et al. |
| 2012/0074891 A1* | 3/2012 | Anderson ............... B60L 53/67 320/108 |
| 2012/0101679 A1 | 4/2012 | Anderson et al. |
| 2012/0143429 A1 | 6/2012 | Anderson |
| 2012/0215380 A1 | 8/2012 | Fouillade et al. |
| 2012/0226381 A1 | 9/2012 | Abramson et al. |
| 2012/0253581 A1 | 10/2012 | Anderson |
| 2012/0265346 A1 | 10/2012 | Gilbert, Jr. et al. |
| 2012/0303160 A1 | 11/2012 | Ziegler et al. |
| 2013/0000677 A1 | 1/2013 | Sumonthee |
| 2013/0031787 A1 | 2/2013 | Kamiya et al. |
| 2013/0031788 A1 | 2/2013 | Ohno |
| 2013/0098402 A1 | 4/2013 | Yoon et al. |
| 2013/0167495 A1 | 7/2013 | Borinato |
| 2013/0193918 A1* | 8/2013 | Sarkar .................. B60L 53/305 320/109 |
| 2013/0214498 A1 | 8/2013 | DeFazio et al. |
| 2014/0000231 A1 | 1/2014 | Bernini |
| 2014/0126952 A1 | 5/2014 | Fay, II |
| 2014/0163733 A1 | 6/2014 | Sadowski et al. |
| 2014/0197222 A1 | 7/2014 | Howe |
| 2014/0203776 A1 | 7/2014 | Ireland et al. |
| 2014/0204510 A1 | 7/2014 | Ireland |
| 2014/0330496 A1 | 11/2014 | Crouse et al. |
| 2015/0012164 A1 | 1/2015 | Yu et al. |
| 2015/0045992 A1 | 2/2015 | Ashby et al. |
| 2015/0120057 A1 | 4/2015 | Wong et al. |
| 2015/0128547 A1 | 5/2015 | Einecke et al. |
| 2015/0163993 A1 | 6/2015 | Pettersson |
| 2015/0181806 A1 | 7/2015 | Lim et al. |
| 2015/0270729 A1 | 9/2015 | Isobe |
| 2015/0301532 A1 | 10/2015 | Norris et al. |
| 2015/0379785 A1 | 12/2015 | Brown, Jr. et al. |
| 2016/0014957 A1 | 1/2016 | Johansson et al. |
| 2016/0075032 A1 | 3/2016 | Goel et al. |
| 2016/0100523 A1 | 4/2016 | Anderson |
| 2016/0128275 A1 | 5/2016 | Johnson |
| 2016/0146611 A1 | 5/2016 | Matthews |
| 2016/0157275 A1 | 6/2016 | Matthews |
| 2016/0174140 A1 | 6/2016 | Wu et al. |
| 2016/0179095 A1 | 6/2016 | Sarid et al. |
| 2016/0187885 A1 | 6/2016 | Pack et al. |
| 2016/0198644 A1 | 7/2016 | Lameli et al. |
| 2016/0272291 A1* | 9/2016 | Outa, .................... G05D 1/10 |
| 2016/0311076 A1 | 10/2016 | Matsumoto et al. |

(56) References Cited

U.S. PATENT DOCUMENTS

| | | |
|---|---|---|
| 2016/0316619 A1 | 11/2016 | Johanek et al. |
| 2016/0338262 A1 | 11/2016 | Liu et al. |
| 2016/0354931 A1 | 12/2016 | Jones et al. |
| 2016/0360695 A1 | 12/2016 | Klackensjö |
| 2016/0378111 A1 | 12/2016 | Lenser et al. |
| 2017/0046663 A1 | 2/2017 | Wong et al. |
| 2017/0088010 A1 | 3/2017 | Tonks et al. |
| 2017/0269595 A1 | 9/2017 | Chen |
| 2017/0303466 A1 | 10/2017 | Grufman et al. |
| 2017/0308092 A1 | 10/2017 | Altinger et al. |
| 2017/0315557 A1* | 11/2017 | Vogt ..................... G05D 1/0242 |
| 2017/0325648 A1 | 11/2017 | Huang |
| 2017/0351260 A1 | 12/2017 | Willgert et al. |
| 2017/0361468 A1 | 12/2017 | Cheuvront et al. |
| 2017/0364091 A1 | 12/2017 | Bennett et al. |
| 2018/0081360 A1* | 3/2018 | Bostick ................ G05D 1/0297 |
| 2018/0103583 A1 | 4/2018 | Stridh |
| 2018/0120852 A1 | 5/2018 | Cho |
| 2018/0184585 A1 | 7/2018 | Song et al. |
| 2018/0184591 A1 | 7/2018 | Song et al. |
| 2018/0232134 A1 | 8/2018 | Ebrahimi Afrouzi et al. |
| 2018/0246516 A1 | 8/2018 | Franzius et al. |
| 2018/0263182 A1 | 9/2018 | Albinger et al. |
| 2018/0267552 A1 | 9/2018 | Artes et al. |
| 2018/0317368 A1 | 11/2018 | Du et al. |
| 2018/0344116 A1 | 12/2018 | Schriesheim et al. |
| 2018/0348787 A1 | 12/2018 | Sandin et al. |
| 2018/0353040 A1* | 12/2018 | Matt ..................... G05D 1/0016 |
| 2019/0041869 A1 | 2/2019 | Shao et al. |
| 2019/0049593 A1 | 2/2019 | He et al. |
| 2019/0049968 A1 | 2/2019 | Dean et al. |
| 2019/0049984 A1 | 2/2019 | Wong et al. |
| 2019/0053423 A1 | 2/2019 | Guiet et al. |
| 2019/0069330 A1 | 2/2019 | Ebrahimi Afrouzi et al. |
| 2019/0113931 A1 | 4/2019 | Zha et al. |
| 2019/0118877 A1 | 4/2019 | Ran et al. |
| 2019/0141886 A1 | 5/2019 | Liu et al. |
| 2019/0141888 A1 | 5/2019 | Balutis et al. |
| 2019/0163175 A1* | 5/2019 | Ko ........................ G05D 1/028 |
| 2019/0166487 A1 | 5/2019 | Russ et al. |
| 2019/0176321 A1 | 6/2019 | Afrouzi et al. |
| 2019/0187714 A1 | 6/2019 | He et al. |
| 2019/0227574 A1 | 7/2019 | Du et al. |
| 2019/0239428 A1 | 8/2019 | Levin et al. |
| 2019/0246862 A1 | 8/2019 | Gilbert, Jr. et al. |
| 2019/0248007 A1 | 8/2019 | Duffy et al. |
| 2019/0250604 A1 | 8/2019 | Balutis et al. |
| 2019/0265724 A1 | 8/2019 | Sheng et al. |
| 2019/0270124 A1 | 9/2019 | Jang et al. |
| 2019/0275666 A1 | 9/2019 | Abramson |
| 2019/0278269 A1 | 9/2019 | He et al. |
| 2019/0297869 A1 | 10/2019 | Michaels et al. |
| 2019/0299398 A1 | 10/2019 | Svensson |
| 2019/0313576 A1 | 10/2019 | Haneda et al. |
| 2019/0320580 A1 | 10/2019 | Haneda et al. |
| 2019/0339719 A1 | 11/2019 | Wang et al. |
| 2019/0343040 A1 | 11/2019 | Testolin et al. |
| 2019/0346848 A1 | 11/2019 | Zhou et al. |
| 2019/0357430 A1 | 11/2019 | Kraft |
| 2019/0357431 A1 | 11/2019 | Kamfors et al. |
| 2019/0369620 A1 | 12/2019 | Zhou et al. |
| 2019/0369629 A1 | 12/2019 | Dalfra |
| 2019/0369640 A1 | 12/2019 | He et al. |
| 2019/0378360 A1 | 12/2019 | Bergenholm et al. |
| 2019/0380266 A1 | 12/2019 | Liljedahl |
| 2019/0383887 A1 | 12/2019 | Kleiner et al. |
| 2019/0384306 A1 | 12/2019 | Jang et al. |
| 2019/0389064 A1* | 12/2019 | High ..................... B25J 13/08 |
| 2019/0391589 A1 | 12/2019 | Komorida et al. |
| 2020/0000023 A1 | 1/2020 | Chung |
| 2020/0019156 A1 | 1/2020 | Drew et al. |
| 2020/0022553 A1 | 1/2020 | Gill et al. |
| 2020/0033386 A1 | 1/2020 | Abramson |
| 2020/0037498 A1 | 2/2020 | Ko et al. |
| 2020/0039079 A1 | 2/2020 | Brouwers et al. |
| 2020/0042011 A1 | 2/2020 | Ärlig et al. |
| 2020/0050208 A1 | 2/2020 | Frick et al. |
| 2020/0073403 A1 | 3/2020 | Abramson et al. |
| 2020/0093058 A1 | 3/2020 | Ritzer et al. |
| 2020/0100425 A1 | 4/2020 | Li |
| 2020/0108499 A1 | 4/2020 | Vicenti |
| 2020/0120863 A1 | 4/2020 | Liu et al. |
| 2020/0128750 A1 | 4/2020 | Svensson et al. |
| 2020/0129029 A1 | 4/2020 | Kim et al. |
| 2020/0139536 A1 | 5/2020 | Frisby et al. |
| 2020/0146211 A1 | 5/2020 | Wahlgren |
| 2020/0154637 A1 | 5/2020 | Doughty |
| 2020/0170180 A1 | 6/2020 | Kong et al. |
| 2020/0172166 A1 | 6/2020 | Chang et al. |
| 2020/0173784 A1 | 6/2020 | Chang |
| 2020/0193071 A1 | 6/2020 | Yu et al. |
| 2020/0196523 A1 | 6/2020 | Ran et al. |
| 2020/0198488 A1 | 6/2020 | Liljedahl |
| 2020/0201328 A1 | 6/2020 | Abramson |
| 2020/0201347 A1 | 6/2020 | Dalfra et al. |
| 2020/0206896 A1 | 7/2020 | Wong et al. |
| 2020/0221633 A1 | 7/2020 | Einecke et al. |
| 2020/0229344 A1 | 7/2020 | Du et al. |
| 2020/0233658 A1 | 7/2020 | Yang et al. |
| 2020/0236846 A1 | 7/2020 | Choi et al. |
| 2020/0237169 A1 | 7/2020 | Song et al. |
| 2020/0239090 A1 | 7/2020 | Kong et al. |
| 2020/0245550 A1 | 8/2020 | Smith et al. |
| 2020/0253116 A1 | 8/2020 | Ladd, Jr. et al. |
| 2020/0256369 A1 | 8/2020 | Gao et al. |
| 2020/0260638 A1 | 8/2020 | Rotole |
| 2020/0267903 A1 | 8/2020 | Gao et al. |
| 2020/0278680 A1 | 9/2020 | Schulz et al. |
| 2020/0278683 A1 | 9/2020 | Dean et al. |
| 2020/0281114 A1 | 9/2020 | Jägenstedt et al. |
| 2020/0281430 A1 | 9/2020 | Morin et al. |
| 2020/0285963 A1 | 9/2020 | Velkey et al. |
| 2020/0287397 A1 | 9/2020 | Jiao et al. |
| 2020/0297180 A1 | 9/2020 | Kang et al. |
| 2020/0315087 A1 | 10/2020 | Svensson et al. |
| 2020/0323191 A1 | 10/2020 | Duncan et al. |
| 2020/0323408 A1 | 10/2020 | Cohen et al. |
| 2020/0326725 A1 | 10/2020 | Churavy et al. |
| 2020/0337201 A1 | 10/2020 | Siekmann |
| 2020/0352082 A1 | 11/2020 | Maeder et al. |
| 2020/0352091 A1 | 11/2020 | Ambros et al. |
| 2020/0356093 A1 | 11/2020 | Shimamura et al. |
| 2020/0362536 A1 | 11/2020 | Shimamura et al. |
| 2020/0363810 A1 | 11/2020 | Arras et al. |
| 2020/0366481 A1 | 11/2020 | Pakkan et al. |
| 2020/0367429 A1 | 11/2020 | Yuan |
| 2020/0369080 A1 | 11/2020 | Cmich |
| 2020/0375096 A1 | 12/2020 | Coleman |
| 2020/0375097 A1 | 12/2020 | Coleman |
| 2020/0375098 A1 | 12/2020 | Muro et al. |
| 2020/0383265 A1 | 12/2020 | Holgersson |
| 2020/0393844 A1 | 12/2020 | Ritzer et al. |
| 2020/0396916 A1 | 12/2020 | He et al. |
| 2020/0401146 A1 | 12/2020 | Strandberg |
| 2021/0000005 A1 | 1/2021 | Robinson |
| 2021/0000008 A1 | 1/2021 | Svensson et al. |
| 2021/0003405 A1 | 1/2021 | Choi |
| 2021/0004895 A1 | 1/2021 | Kuriyagawa et al. |
| 2021/0016453 A1 | 1/2021 | Patel et al. |
| 2021/0018927 A1 | 1/2021 | Ackerman et al. |
| 2021/0029873 A1 | 2/2021 | Yamauchi et al. |
| 2021/0029874 A1 | 2/2021 | Robertsson |
| 2021/0031367 A1 | 2/2021 | Mirzaei et al. |
| 2021/0037703 A1 | 2/2021 | Holgersson |
| 2021/0041871 A1 | 2/2021 | Lai et al. |
| 2021/0048831 A1 | 2/2021 | Yun et al. |
| 2021/0059112 A1 | 3/2021 | Kim |
| 2021/0064036 A1 | 3/2021 | Muro et al. |
| 2021/0064050 A1 | 3/2021 | Pickett et al. |
| 2021/0070356 A1 | 3/2021 | Lyzen et al. |
| 2021/0072764 A1 | 3/2021 | Kean |
| 2021/0076562 A1 | 3/2021 | Doughty et al. |
| 2021/0076563 A1 | 3/2021 | Andriolo et al. |
| 2021/0076892 A1 | 3/2021 | Schriesheim et al. |

(56) References Cited

U.S. PATENT DOCUMENTS

| | | |
|---|---|---|
| 2021/0083492 A1 | 3/2021 | Towner et al. |
| 2021/0083493 A1 | 3/2021 | Towner et al. |
| 2021/0083494 A1 | 3/2021 | Towner et al. |
| 2021/0084815 A1 | 3/2021 | Li et al. |
| 2021/0089034 A1 | 3/2021 | Hjelmaker |
| 2021/0092912 A1 | 4/2021 | Wykman et al. |
| 2021/0094346 A1 | 4/2021 | Cmich |
| 2021/0100160 A1 | 4/2021 | Kang et al. |
| 2021/0100161 A1 | 4/2021 | Balutis et al. |
| 2021/0107363 A1 | 4/2021 | Han et al. |
| 2021/0114810 A1 | 4/2021 | Matsuoka et al. |
| 2021/0116933 A1 | 4/2021 | Ouyang |
| 2021/0125366 A1 | 4/2021 | Hasberg et al. |
| 2021/0127569 A1 | 5/2021 | Gruhler et al. |
| 2021/0132604 A1 | 5/2021 | Gillett |
| 2021/0132624 A1 | 5/2021 | Andriolo et al. |
| 2021/0132625 A1 | 5/2021 | Gillett |
| 2021/0132626 A1 | 5/2021 | Gillett |
| 2021/0153428 A1 | 5/2021 | Mittmann et al. |
| 2021/0153710 A1 | 5/2021 | Mosebach et al. |
| 2021/0157331 A1 | 5/2021 | He |
| 2021/0161065 A1 | 6/2021 | Holgersson |
| 2021/0165109 A1 | 6/2021 | Yang et al. |
| 2021/0165411 A1 | 6/2021 | Andriolo et al. |
| 2021/0168999 A1 | 6/2021 | Xu |
| 2021/0176915 A1 | 6/2021 | Vines et al. |
| 2021/0179137 A1 | 6/2021 | Gillett |
| 2021/0185911 A1 | 6/2021 | Agerhall |
| 2021/0191764 A1 | 6/2021 | Dalfra |
| 2021/0200226 A1 | 7/2021 | Wang et al. |
| 2021/0200228 A1 | 7/2021 | Grufman et al. |
| 2021/0204473 A1 | 7/2021 | Andriolo et al. |
| 2021/0206367 A1 | 7/2021 | Liu et al. |
| 2021/0216070 A1 | 7/2021 | VanKampen et al. |
| 2021/0219488 A1 | 7/2021 | Zhao et al. |
| 2021/0221246 A1 | 7/2021 | Liu et al. |
| 2021/0223787 A1 | 7/2021 | Pellisari |
| 2021/0227744 A1 | 7/2021 | Zhou et al. |
| 2021/0228043 A1 | 7/2021 | Jang et al. |
| 2021/0230622 A1 | 7/2021 | Crow et al. |
| 2021/0235616 A1 | 8/2021 | Stark et al. |
| 2021/0255638 A1 | 8/2021 | Ma et al. |
| 2021/0259497 A1 | 8/2021 | Park et al. |
| 2021/0263131 A1 | 8/2021 | Dalfra |
| 2021/0263529 A1 | 8/2021 | Takahashi et al. |
| 2021/0270338 A1 | 9/2021 | Ederfors |
| 2021/0272438 A1 | 9/2021 | Askenmalm |
| 2021/0274705 A1 | 9/2021 | Mårtensson et al. |
| 2021/0282322 A1 | 9/2021 | Yoon et al. |
| 2021/0286376 A1 | 9/2021 | Takahashi et al. |
| 2021/0289695 A1 | 9/2021 | Grufman et al. |
| 2021/0294348 A1 | 9/2021 | Lan et al. |
| 2021/0298232 A1 | 9/2021 | Wolf et al. |
| 2021/0302999 A1 | 9/2021 | Yokoyama et al. |
| 2021/0311484 A1 | 10/2021 | Lee et al. |
| 2021/0315155 A1 | 10/2021 | Lee et al. |
| 2021/0321854 A1 | 10/2021 | Zhang et al. |
| 2021/0325872 A1 | 10/2021 | Schlacks, IV et al. |
| 2021/0325874 A1 | 10/2021 | Schlacks, IV et al. |
| 2021/0325875 A1 | 10/2021 | Schlacks, IV et al. |
| 2021/0325876 A1 | 10/2021 | Schlacks, IV et al. |
| 2021/0325877 A1 | 10/2021 | Schlacks, IV et al. |
| 2021/0325878 A1 | 10/2021 | Schlacks, IV et al. |
| 2021/0328991 A1 | 10/2021 | Dean et al. |
| 2021/0329841 A1 | 10/2021 | Cuong et al. |
| 2021/0331594 A1 | 10/2021 | Svensson et al. |
| 2021/0337726 A1 | 11/2021 | Keski-Luopa et al. |
| 2021/0344299 A1 | 11/2021 | Layne et al. |
| 2021/0345544 A1 | 11/2021 | Han et al. |
| 2021/0345545 A1 | 11/2021 | Zhao et al. |
| 2021/0347204 A1 | 11/2021 | Cmich |
| 2021/0352841 A1 | 11/2021 | Edfors et al. |
| 2021/0352842 A1 | 11/2021 | Pu et al. |
| 2021/0352843 A1 | 11/2021 | Zhao et al. |
| 2021/0360853 A1 | 11/2021 | Herrera |
| 2021/0365044 A1 | 11/2021 | Xue et al. |
| 2021/0382476 A1 | 12/2021 | Morrison et al. |
| 2022/0009363 A1 | 1/2022 | Gilbert, Jr. et al. |
| 2022/0022371 A1 | 1/2022 | Askenmalm et al. |
| 2022/0022386 A1 | 1/2022 | Danling |
| 2022/0029477 A1 | 1/2022 | He et al. |
| 2022/0030766 A1 | 2/2022 | Johansson |
| 2022/0039313 A1 | 2/2022 | Morrison et al. |
| 2022/0061212 A1 | 3/2022 | Zeiler et al. |
| 2022/0066456 A1 | 3/2022 | Ebrahimi Afrouzi et al. |
| 2022/0071086 A1 | 3/2022 | Levin et al. |
| 2022/0071465 A1 | 3/2022 | Kim et al. |
| 2022/0083075 A1 | 3/2022 | Heiss et al. |
| 2022/0091257 A1 | 3/2022 | Almers et al. |
| 2022/0100197 A1 | 3/2022 | Chao |
| 2022/0124973 A1 | 4/2022 | Juel |
| 2022/0129000 A1 | 4/2022 | Ingvalson et al. |
| 2022/0142438 A1 | 5/2022 | Chen et al. |
| 2022/0151143 A1 | 5/2022 | Liljedahl et al. |
| 2022/0151147 A1 | 5/2022 | Chen et al. |
| 2022/0167552 A1 | 6/2022 | Frick et al. |
| 2022/0167553 A1 | 6/2022 | Rogö et al. |
| 2022/0174868 A1 | 6/2022 | Flygare |
| 2022/0180282 A1 | 6/2022 | Powell et al. |
| 2022/0183223 A1 | 6/2022 | Svensson et al. |
| 2022/0183226 A1 | 6/2022 | Paolo Andriolo |
| 2022/0217902 A1 | 7/2022 | Chen et al. |
| 2022/0217904 A1 | 7/2022 | Svensson et al. |
| 2022/0240444 A1 | 8/2022 | Wang et al. |
| 2022/0261006 A1 | 8/2022 | Zaslavsky et al. |
| 2022/0272897 A1 | 9/2022 | Jiao et al. |
| 2022/0295696 A1 | 9/2022 | Holgersson et al. |
| 2022/0295709 A1 | 9/2022 | Wisse et al. |
| 2022/0322603 A1 | 10/2022 | Inaba et al. |
| 2022/0322908 A1 | 10/2022 | Cha et al. |
| 2022/0324112 A1 | 10/2022 | Wolowelsky et al. |
| 2022/0326709 A1 | 10/2022 | Andriolo |
| 2022/0334244 A1 | 10/2022 | Li et al. |
| 2022/0342425 A1 | 10/2022 | Glimberg et al. |
| 2022/0354050 A1 | 11/2022 | Du et al. |
| 2022/0396969 A1 | 12/2022 | Arvidsson et al. |
| 2023/0008134 A1 | 1/2023 | Olofsson et al. |
| 2023/0008169 A1 | 1/2023 | Cuong et al. |
| 2023/0009964 A1 | 1/2023 | Jonsson et al. |
| 2023/0010420 A1 | 1/2023 | Glimberg et al. |
| 2023/0015812 A1 | 1/2023 | Wikestad et al. |
| 2023/0017821 A1 | 1/2023 | Ma et al. |
| 2023/0034100 A1 | 2/2023 | Holgersson et al. |
| 2023/0042864 A1 | 2/2023 | Danling et al. |
| 2023/0051150 A1 | 2/2023 | Pu et al. |
| 2023/0059610 A1 | 2/2023 | Mei et al. |
| 2023/0071262 A1 | 3/2023 | Lundkvist et al. |
| 2023/0074101 A1 | 3/2023 | Mårtensson et al. |
| 2023/0081732 A1 | 3/2023 | Abramson |
| 2023/0085538 A1 | 3/2023 | Lundkvist et al. |
| 2023/0092131 A1 | 3/2023 | Lao et al. |
| 2023/0117845 A1 | 4/2023 | Holgersson et al. |
| 2023/0119277 A1 | 4/2023 | Leijonberger |
| 2023/0138339 A1 | 5/2023 | Wikestad |
| 2023/0145580 A1 | 5/2023 | Hong et al. |
| 2023/0152817 A1 | 5/2023 | Huang et al. |
| 2023/0161357 A1 | 5/2023 | Liljedahl et al. |
| 2023/0176000 A1 | 6/2023 | Abbott et al. |
| 2023/0176225 A1 | 6/2023 | Mårtensson et al. |
| 2023/0185309 A1 | 6/2023 | Glimberg et al. |
| 2023/0189705 A1 | 6/2023 | Svensson et al. |

FOREIGN PATENT DOCUMENTS

| | | |
|---|---|---|
| AU | 2011239328 A1 | 11/2011 |
| AU | 2012101338 A4 | 11/2012 |
| AU | 2014201952 A1 | 4/2014 |
| AU | 2015230722 A1 | 10/2015 |
| CA | 1079076 A | 6/1980 |
| CN | 2382585 Y | 6/2000 |
| CN | 2693167 Y | 4/2005 |
| CN | 3512456 | 3/2006 |
| CN | 3599999 | 1/2007 |
| CN | 3626101 | 3/2007 |

(56) References Cited

FOREIGN PATENT DOCUMENTS

| | | | |
|---|---|---|---|
| CN | 101185088 A | 5/2008 |
| CN | 300775531 | 5/2008 |
| CN | 201127182 Y | 10/2008 |
| CN | 101313319 A | 11/2008 |
| CN | 201226676 Y | 4/2009 |
| CN | 201226677 Y | 4/2009 |
| CN | 100485567 C | 5/2009 |
| CN | 100498602 C | 6/2009 |
| CN | 201260303 Y | 6/2009 |
| CN | 301144405 S | 2/2010 |
| CN | 301276003 S | 6/2010 |
| CN | 301290512 S | 7/2010 |
| CN | 201557392 U | 8/2010 |
| CN | 301328063 | 8/2010 |
| CN | 101292244 B | 12/2010 |
| CN | 301444971 | 1/2011 |
| CN | 101982037 A | 3/2011 |
| CN | 201797741 U | 4/2011 |
| CN | 301506267 | 4/2011 |
| CN | 201846616 U | 6/2011 |
| CN | 301573109 | 6/2011 |
| CN | 301611305 | 7/2011 |
| CN | 301653707 | 8/2011 |
| CN | 301660006 | 8/2011 |
| CN | 301742022 | 11/2011 |
| CN | 202077380 U | 12/2011 |
| CN | 102523841 A | 7/2012 |
| CN | 302020661 | 8/2012 |
| CN | 102687620 A | 9/2012 |
| CN | 102687625 A | 9/2012 |
| CN | 302080704 | 9/2012 |
| CN | 102771246 A | 11/2012 |
| CN | 102771259 A | 11/2012 |
| CN | 302218376 | 12/2012 |
| CN | 102880175 A | 1/2013 |
| CN | 302299693 | 1/2013 |
| CN | 302350176 | 3/2013 |
| CN | 302456271 | 6/2013 |
| CN | 302483861 | 6/2013 |
| CN | 103294056 A | 9/2013 |
| CN | 103324191 A | 9/2013 |
| CN | 103324192 A | 9/2013 |
| CN | 203233683 U | 10/2013 |
| CN | 302629702 | 11/2013 |
| CN | 103473497 A | 12/2013 |
| CN | 302702748 | 1/2014 |
| CN | 103578164 A | 2/2014 |
| CN | 103676947 A | 3/2014 |
| CN | 203575087 U | 5/2014 |
| CN | 103858584 A | 6/2014 |
| CN | 203691948 U | 7/2014 |
| CN | 203735069 U | 7/2014 |
| CN | 302881351 | 7/2014 |
| CN | 104007765 A | 8/2014 |
| CN | 104025796 A | 9/2014 |
| CN | 203840762 U | 9/2014 |
| CN | 302943247 | 9/2014 |
| CN | 302943249 | 9/2014 |
| CN | 104094727 A | 10/2014 |
| CN | 104111460 A | 10/2014 |
| CN | 104111651 A | 10/2014 |
| CN | 104111652 A | 10/2014 |
| CN | 104111653 A | 10/2014 |
| CN | 203851480 U | 10/2014 |
| CN | 302974154 | 10/2014 |
| CN | 104160830 A | 11/2014 |
| CN | 302993652 | 11/2014 |
| CN | 204014494 U | 12/2014 |
| CN | 204047176 U | 12/2014 |
| CN | 303058887 | 12/2014 |
| CN | 303075143 | 1/2015 |
| CN | 104360684 A | 2/2015 |
| CN | 204143255 U | 2/2015 |
| CN | 104571102 A | 4/2015 |
| CN | 104686050 A | 6/2015 |
| CN | 104704979 A | 6/2015 |
| CN | 104704980 A | 6/2015 |
| CN | 204362599 U | 6/2015 |
| CN | 303232131 | 6/2015 |
| CN | 104737699 A | 7/2015 |
| CN | 104750104 A | 7/2015 |
| CN | 104782314 A | 7/2015 |
| CN | 104793614 A | 7/2015 |
| CN | 104793617 A | 7/2015 |
| CN | 204443108 U | 7/2015 |
| CN | 204462853 U | 7/2015 |
| CN | 204495362 U | 7/2015 |
| CN | 204515530 U | 7/2015 |
| CN | 204539960 U | 8/2015 |
| CN | 303318601 | 8/2015 |
| CN | 104904403 A | 9/2015 |
| CN | 104904404 A | 9/2015 |
| CN | 204613789 U | 9/2015 |
| CN | 204649212 U | 9/2015 |
| CN | 303408640 | 10/2015 |
| CN | 105082080 A | 11/2015 |
| CN | 105096177 A | 11/2015 |
| CN | 303452341 | 11/2015 |
| CN | 303452355 | 11/2015 |
| CN | 105163037 A | 12/2015 |
| CN | 204810982 U | 12/2015 |
| CN | 204858702 U | 12/2015 |
| CN | 204925588 U | 12/2015 |
| CN | 303478376 | 12/2015 |
| CN | 303519781 | 12/2015 |
| CN | 105230225 A | 1/2016 |
| CN | 103621244 B | 2/2016 |
| CN | 105353758 A | 2/2016 |
| CN | 303579400 | 2/2016 |
| CN | 105432212 A | 3/2016 |
| CN | 105512689 A | 4/2016 |
| CN | 303654613 | 4/2016 |
| CN | 105557175 A | 5/2016 |
| CN | 105573308 A | 5/2016 |
| CN | 105573311 A | 5/2016 |
| CN | 303670522 | 5/2016 |
| CN | 105660039 A | 6/2016 |
| CN | 105684630 A | 6/2016 |
| CN | 105700521 A | 6/2016 |
| CN | 205335882 U | 6/2016 |
| CN | 205336853 U | 6/2016 |
| CN | 303690781 | 6/2016 |
| CN | 105759813 A | 7/2016 |
| CN | 205431101 U | 8/2016 |
| CN | 205489586 U | 8/2016 |
| CN | 303778782 | 8/2016 |
| CN | 303862286 | 9/2016 |
| CN | 103283404 B | 10/2016 |
| CN | 105988469 A | 10/2016 |
| CN | 105988470 A | 10/2016 |
| CN | 106020207 A | 10/2016 |
| CN | 303888354 | 10/2016 |
| CN | 303888360 | 10/2016 |
| CN | 106142023 A | 11/2016 |
| CN | 205694315 U | 11/2016 |
| CN | 303933081 | 11/2016 |
| CN | 103941600 B | 12/2016 |
| CN | 106171248 A | 12/2016 |
| CN | 205812811 U | 12/2016 |
| CN | 205829192 U | 12/2016 |
| CN | 205830138 U | 12/2016 |
| CN | 303969591 | 12/2016 |
| CN | 106258166 A | 1/2017 |
| CN | 106325280 A | 1/2017 |
| CN | 106355609 A | 1/2017 |
| CN | 304004639 | 1/2017 |
| CN | 106393094 A | 2/2017 |
| CN | 106406301 A | 2/2017 |
| CN | 304055132 | 2/2017 |
| CN | 304055134 | 2/2017 |
| CN | 304055136 | 2/2017 |
| CN | 106489412 A | 3/2017 |
| CN | 205993268 U | 3/2017 |
| CN | 103576681 B | 4/2017 |

(56) References Cited

FOREIGN PATENT DOCUMENTS

| | | |
|---|---|---|
| CN | 206115269 U | 4/2017 |
| CN | 304095129 | 4/2017 |
| CN | 106647727 A | 5/2017 |
| CN | 106708033 A | 5/2017 |
| CN | 206196372 U | 5/2017 |
| CN | 304129527 | 5/2017 |
| CN | 304129534 | 5/2017 |
| CN | 106852225 A | 6/2017 |
| CN | 106877420 A | 6/2017 |
| CN | 206274765 U | 6/2017 |
| CN | 206278169 U | 6/2017 |
| CN | 304175254 | 6/2017 |
| CN | 304208974 | 7/2017 |
| CN | 107024910 A | 8/2017 |
| CN | 304227934 | 8/2017 |
| CN | 304241160 | 8/2017 |
| CN | 206472500 U | 9/2017 |
| CN | 304283754 | 9/2017 |
| CN | 206547328 U | 10/2017 |
| CN | 206547363 U | 10/2017 |
| CN | 206611777 U | 11/2017 |
| CN | 206611791 U | 11/2017 |
| CN | 206611812 U | 11/2017 |
| CN | 206619022 U | 11/2017 |
| CN | 107463166 A | 12/2017 |
| CN | 107463168 A | 12/2017 |
| CN | 107505939 A | 12/2017 |
| CN | 107515603 A | 12/2017 |
| CN | 107516226 A | 12/2017 |
| CN | 107517642 A | 12/2017 |
| CN | 206686605 U | 12/2017 |
| CN | 206808075 U | 12/2017 |
| CN | 107544483 A | 1/2018 |
| CN | 107600209 A | 1/2018 |
| CN | 107624368 A | 1/2018 |
| CN | 207037461 U | 2/2018 |
| CN | 107800200 A | 3/2018 |
| CN | 207075257 U | 3/2018 |
| CN | 304529661 | 3/2018 |
| CN | 304544247 | 3/2018 |
| CN | 107888751 A | 4/2018 |
| CN | 107913034 A | 4/2018 |
| CN | 107960191 A | 4/2018 |
| CN | 207201326 U | 4/2018 |
| CN | 304565875 | 4/2018 |
| CN | 108055906 A | 5/2018 |
| CN | 108064539 A | 5/2018 |
| CN | 108073179 A | 5/2018 |
| CN | 108156957 A | 6/2018 |
| CN | 108205313 A | 6/2018 |
| CN | 207496811 U | 6/2018 |
| CN | 108323326 A | 7/2018 |
| CN | 108337987 A | 7/2018 |
| CN | 108345297 A | 7/2018 |
| CN | 108345298 A | 7/2018 |
| CN | 207639110 U | 7/2018 |
| CN | 207651536 U | 7/2018 |
| CN | 207692389 U | 8/2018 |
| CN | 304767946 | 8/2018 |
| CN | 304794944 | 8/2018 |
| CN | 207851614 U | 9/2018 |
| CN | 304806495 | 9/2018 |
| CN | 304811825 | 9/2018 |
| CN | 108664014 A | 10/2018 |
| CN | 108693873 A | 10/2018 |
| CN | 207965652 U | 10/2018 |
| CN | 108919814 A | 11/2018 |
| CN | 208159284 U | 11/2018 |
| CN | 108957512 A | 12/2018 |
| CN | 109062225 A | 12/2018 |
| CN | 109075284 A | 12/2018 |
| CN | 208175354 U | 12/2018 |
| CN | 208285831 U | 12/2018 |
| CN | 304926953 | 12/2018 |
| CN | 304926955 | 12/2018 |
| CN | 109213123 A | 1/2019 |
| CN | 208387297 U | 1/2019 |
| CN | 304980236 | 1/2019 |
| CN | 305010344 | 1/2019 |
| CN | 305010365 | 1/2019 |
| CN | 305017366 | 1/2019 |
| CN | 105875063 B | 2/2019 |
| CN | 208480301 U | 2/2019 |
| CN | 208521989 U | 2/2019 |
| CN | 305027640 | 2/2019 |
| CN | 109542092 A | 3/2019 |
| CN | 208638993 U | 3/2019 |
| CN | 109566065 A | 4/2019 |
| CN | 109601114 A | 4/2019 |
| CN | 109658937 A | 4/2019 |
| CN | 109682368 A | 4/2019 |
| CN | 109682371 A | 4/2019 |
| CN | 109683604 A | 4/2019 |
| CN | 109696888 A | 4/2019 |
| CN | 208739598 U | 4/2019 |
| CN | 208752461 U | 4/2019 |
| CN | 109757189 A | 5/2019 |
| CN | 106982585 B | 6/2019 |
| CN | 109892096 A | 6/2019 |
| CN | 209002355 U | 6/2019 |
| CN | 209002393 U | 6/2019 |
| CN | 305196413 | 6/2019 |
| CN | 305225230 | 6/2019 |
| CN | 305227797 | 6/2019 |
| CN | 305227798 | 6/2019 |
| CN | 305227800 | 6/2019 |
| CN | 109960253 A | 7/2019 |
| CN | 109962512 A | 7/2019 |
| CN | 109983907 A | 7/2019 |
| CN | 109983908 A | 7/2019 |
| CN | 110018686 A | 7/2019 |
| CN | 209170907 U | 7/2019 |
| CN | 305261165 | 7/2019 |
| CN | 305261166 | 7/2019 |
| CN | 305265564 | 7/2019 |
| CN | 209265268 U | 8/2019 |
| CN | 209299766 U | 8/2019 |
| CN | 106155056 B | 9/2019 |
| CN | 110221594 A | 9/2019 |
| CN | 110268858 A | 9/2019 |
| CN | 209409782 U | 9/2019 |
| CN | 305355791 | 9/2019 |
| CN | 305357008 | 9/2019 |
| CN | 110347144 A | 10/2019 |
| CN | 110366368 A | 10/2019 |
| CN | 305407445 | 10/2019 |
| CN | 110447372 A | 11/2019 |
| CN | 209676901 U | 11/2019 |
| CN | 305447400 | 11/2019 |
| CN | 305452583 | 11/2019 |
| CN | 110584551 A | 12/2019 |
| CN | 110622680 A | 12/2019 |
| CN | 209861609 U | 12/2019 |
| CN | 305503785 | 12/2019 |
| CN | 305523640 | 12/2019 |
| CN | 209955654 U | 1/2020 |
| CN | 209964645 U | 1/2020 |
| CN | 305574602 | 1/2020 |
| CN | 110764495 A | 2/2020 |
| CN | 110850858 A | 2/2020 |
| CN | 110850860 A | 2/2020 |
| CN | 110852133 A | 2/2020 |
| CN | 210016305 U | 2/2020 |
| CN | 210116329 U | 2/2020 |
| CN | 305596393 | 2/2020 |
| CN | 105988472 B | 3/2020 |
| CN | 107493797 B | 3/2020 |
| CN | 110881903 A | 3/2020 |
| CN | 110895411 A | 3/2020 |
| CN | 110915409 A | 3/2020 |
| CN | 110928280 A | 3/2020 |
| CN | 110928285 A | 3/2020 |
| CN | 107643751 B | 4/2020 |
| CN | 111034450 A | 4/2020 |

(56) References Cited

FOREIGN PATENT DOCUMENTS

| | | | |
|---|---|---|---|
| CN | 111045423 A | 4/2020 |
| CN | 305716236 | 4/2020 |
| CN | 107643750 B | 5/2020 |
| CN | 108142070 B | 5/2020 |
| CN | 111123910 A | 5/2020 |
| CN | 111165158 A | 5/2020 |
| CN | 210444878 U | 5/2020 |
| CN | 210580043 U | 5/2020 |
| CN | 305750432 | 5/2020 |
| CN | 305757781 | 5/2020 |
| CN | 305789888 | 5/2020 |
| CN | 111226569 A | 6/2020 |
| CN | 210782124 U | 6/2020 |
| CN | 210808273 U | 6/2020 |
| CN | 210821640 U | 6/2020 |
| CN | 210839520 U | 6/2020 |
| CN | 305827495 | 6/2020 |
| CN | 305827496 | 6/2020 |
| CN | 305827503 | 6/2020 |
| CN | 305860595 | 6/2020 |
| CN | 305860598 | 6/2020 |
| CN | 305869411 | 6/2020 |
| CN | 106717462 B | 7/2020 |
| CN | 108811699 B | 7/2020 |
| CN | 210900401 U | 7/2020 |
| CN | 210987056 U | 7/2020 |
| CN | 211015146 U | 7/2020 |
| CN | 305946746 | 7/2020 |
| CN | 305946760 | 7/2020 |
| CN | 111487982 A | 8/2020 |
| CN | 111512766 A | 8/2020 |
| CN | 211212948 U | 8/2020 |
| CN | 305989577 | 8/2020 |
| CN | 306019404 | 8/2020 |
| CN | 105988471 B | 9/2020 |
| CN | 111685651 A | 9/2020 |
| CN | 211531846 U | 9/2020 |
| CN | 211580673 U | 9/2020 |
| CN | 107637255 B | 10/2020 |
| CN | 110754204 B | 10/2020 |
| CN | 111742692 A | 10/2020 |
| CN | 111766589 A | 10/2020 |
| CN | 111819988 A | 10/2020 |
| CN | 211721118 U | 10/2020 |
| CN | 211721119 U | 10/2020 |
| CN | 211741921 U | 10/2020 |
| CN | 211741924 U | 10/2020 |
| CN | 306085189 | 10/2020 |
| CN | 306128197 | 10/2020 |
| CN | 306140210 | 10/2020 |
| CN | 306174630 S | 11/2020 |
| CN | 112009175 A | 12/2020 |
| CN | 112119742 A | 12/2020 |
| CN | 112120620 A | 12/2020 |
| CN | 112134314 A | 12/2020 |
| CN | 112147992 A | 12/2020 |
| CN | 212061111 U | 12/2020 |
| CN | 212116218 U | 12/2020 |
| CN | 212116223 U | 12/2020 |
| CN | 306223128 | 12/2020 |
| CN | 306236075 | 12/2020 |
| CN | 306236808 | 12/2020 |
| CN | 112230636 A | 1/2021 |
| CN | 112230637 A | 1/2021 |
| CN | 112230644 A | 1/2021 |
| CN | 112235760 A | 1/2021 |
| CN | 112259866 A | 1/2021 |
| CN | 112261631 A | 1/2021 |
| CN | 212304892 U | 1/2021 |
| CN | 212305863 U | 1/2021 |
| CN | 306278588 S | 1/2021 |
| CN | 306303188 S | 1/2021 |
| CN | 106909140 B | 2/2021 |
| CN | 109247117 B | 2/2021 |
| CN | 109683556 B | 2/2021 |
| CN | 112306049 A | 2/2021 |
| CN | 112385401 A | 2/2021 |
| CN | 112400453 A | 2/2021 |
| CN | 212499740 U | 2/2021 |
| CN | 212515710 U | 2/2021 |
| CN | 212520009 U | 2/2021 |
| CN | 212539202 U | 2/2021 |
| CN | 212572469 U | 2/2021 |
| CN | 212621511 U | 2/2021 |
| CN | 306328112 S | 2/2021 |
| CN | 112435422 A | 3/2021 |
| CN | 112438114 A | 3/2021 |
| CN | 112445221 A | 3/2021 |
| CN | 112449864 A | 3/2021 |
| CN | 112492956 A | 3/2021 |
| CN | 112514637 A | 3/2021 |
| CN | 112567959 A | 3/2021 |
| CN | 112567961 A | 3/2021 |
| CN | 212696648 U | 3/2021 |
| CN | 212696668 U | 3/2021 |
| CN | 306358736 S | 3/2021 |
| CN | 112602441 A | 4/2021 |
| CN | 112720451 A | 4/2021 |
| CN | 112731935 A | 4/2021 |
| CN | 212876733 U | 4/2021 |
| CN | 212906002 U | 4/2021 |
| CN | 212933333 U | 4/2021 |
| CN | 212970834 U | 4/2021 |
| CN | 213075541 U | 4/2021 |
| CN | 213091901 U | 4/2021 |
| CN | 112740889 A | 5/2021 |
| CN | 112764419 A | 5/2021 |
| CN | 112769424 A | 5/2021 |
| CN | 112773264 A | 5/2021 |
| CN | 112799395 A | 5/2021 |
| CN | 112799399 A | 5/2021 |
| CN | 112823584 A | 5/2021 |
| CN | 112824993 A | 5/2021 |
| CN | 112826376 A | 5/2021 |
| CN | 112840828 A | 5/2021 |
| CN | 112859828 A | 5/2021 |
| CN | 213187216 U | 5/2021 |
| CN | 213210764 U | 5/2021 |
| CN | 213214364 U | 5/2021 |
| CN | 213240579 U | 5/2021 |
| CN | 306569555 S | 5/2021 |
| CN | 306569560 S | 5/2021 |
| CN | 107976995 B | 6/2021 |
| CN | 110122045 B | 6/2021 |
| CN | 112947399 A | 6/2021 |
| CN | 112970414 A | 6/2021 |
| CN | 113039919 A | 6/2021 |
| CN | 213306269 U | 6/2021 |
| CN | 21381400 | 7/2021 |
| CN | 113064419 A | 7/2021 |
| CN | 113156928 A | 7/2021 |
| CN | 113156929 A | 7/2021 |
| CN | 306670241 S | 7/2021 |
| CN | 306680105 S | 7/2021 |
| CN | 306694791 S | 7/2021 |
| CN | 106300578 B | 8/2021 |
| CN | 108781704 B | 8/2021 |
| CN | 113311830 A | 8/2021 |
| CN | 213850492 U | 8/2021 |
| CN | 213921292 U | 8/2021 |
| CN | 306745285 S | 8/2021 |
| CN | 306753239 S | 8/2021 |
| CN | 306768440 S | 8/2021 |
| CN | 113366964 A | 9/2021 |
| CN | 113439526 A | 9/2021 |
| CN | 113448259 A | 9/2021 |
| CN | 214126036 U | 9/2021 |
| CN | 214151499 U | 9/2021 |
| CN | 214178073 U | 9/2021 |
| CN | 214240309 U | 9/2021 |
| CN | 306824139 | 9/2021 |
| CN | 306839148 | 9/2021 |
| CN | 306846782 | 9/2021 |
| CN | 113455167 A | 10/2021 |

(56) References Cited

FOREIGN PATENT DOCUMENTS

| | | |
|---|---|---|
| CN | 113552873 A | 10/2021 |
| CN | 113552874 A | 10/2021 |
| CN | 214508006 U | 10/2021 |
| CN | 306880401 | 10/2021 |
| CN | 113721749 A | 11/2021 |
| CN | 214852822 U | 11/2021 |
| CN | 113759377 A | 12/2021 |
| CN | 113759886 A | 12/2021 |
| CN | 113771556 A | 12/2021 |
| CN | 113778084 A | 12/2021 |
| CN | 113805573 A | 12/2021 |
| CN | 113812251 A | 12/2021 |
| CN | 215011658 U | 12/2021 |
| CN | 215041875 U | 12/2021 |
| CN | 215073955 U | 12/2021 |
| CN | 215122126 U | 12/2021 |
| CN | 215223139 U | 12/2021 |
| CN | 215223140 U | 12/2021 |
| CN | 215244172 U | 12/2021 |
| CN | 215269503 U | 12/2021 |
| CN | 215321765 U | 12/2021 |
| CN | 307035324 | 12/2021 |
| CN | 113892332 A | 1/2022 |
| CN | 113970918 A | 1/2022 |
| CN | 307047963 | 1/2022 |
| CN | 307047966 | 1/2022 |
| CN | 114089423 A | 2/2022 |
| CN | 215774282 U | 2/2022 |
| CN | 215813854 U | 2/2022 |
| CN | 215911524 U | 2/2022 |
| CN | 307125064 | 2/2022 |
| CN | 114097400 A | 3/2022 |
| CN | 307168522 | 3/2022 |
| CN | 307168531 | 3/2022 |
| CN | 307168534 | 3/2022 |
| CN | 307168536 | 3/2022 |
| CN | 307202311 | 3/2022 |
| CN | 216153511 U | 4/2022 |
| CN | 216253986 U | 4/2022 |
| CN | 307222105 | 4/2022 |
| CN | 307243485 | 4/2022 |
| CN | 307265564 | 4/2022 |
| CN | 307265565 | 4/2022 |
| CN | 307278021 | 4/2022 |
| CN | 307278029 | 4/2022 |
| CN | 307301254 | 4/2022 |
| CN | 216507708 U | 5/2022 |
| CN | 216610752 U | 5/2022 |
| CN | 307325242 | 5/2022 |
| CN | 307337031 | 5/2022 |
| CN | 307347754 | 5/2022 |
| CN | 307347757 | 5/2022 |
| CN | 307369096 | 5/2022 |
| CN | 307369129 | 5/2022 |
| CN | 307376792 | 5/2022 |
| CN | 115666221 A | 1/2023 |
| DE | 7345220 U | 6/1974 |
| DE | 7345211 U | 11/1974 |
| DE | 2437756 A1 | 3/1975 |
| DE | 2448130 A1 | 4/1976 |
| DE | 7609000 U1 | 9/1977 |
| DE | 2612381 A1 | 10/1977 |
| DE | 19521067 A1 | 12/1996 |
| DE | 19644057 A1 | 5/1998 |
| DE | 29823263 U1 | 4/1999 |
| DE | 19933340 A1 | 1/2001 |
| DE | 20308046 U1 | 7/2003 |
| DE | 10302908 A1 | 8/2004 |
| DE | 102006038553 A1 | 2/2008 |
| DE | 102007053310 A1 | 6/2009 |
| DE | 102007060056 A1 | 6/2009 |
| DE | 102008011947 A1 | 9/2009 |
| DE | 202010007832 U1 | 8/2010 |
| DE | 402010004757-0001 | 11/2010 |
| DE | 102009027557 A1 | 1/2011 |
| DE | 202012011298 U1 | 1/2013 |
| DE | 202012009375 U1 | 4/2013 |
| DE | 102013202075 A1 | 8/2014 |
| DE | 202013101894 U1 | 8/2014 |
| DE | 102013203549 A1 | 9/2014 |
| DE | 102013203705 A1 | 9/2014 |
| DE | 202014005547 U1 | 9/2014 |
| DE | 202014102390 U1 | 9/2014 |
| DE | 102014211712 A1 | 2/2015 |
| DE | 102014112587 A1 | 3/2015 |
| DE | 102014208434 A1 | 11/2015 |
| DE | 102014210277 A1 | 12/2015 |
| DE | 102014212399 A1 | 12/2015 |
| DE | 102016205336 A1 | 10/2017 |
| DE | 102016219270 A1 | 4/2018 |
| DE | 102016222659 A1 | 5/2018 |
| DE | 202018100833 U1 | 5/2018 |
| DE | 202018100835 U1 | 5/2018 |
| DE | 202018100836 U1 | 5/2018 |
| DE | 102017204865 A1 | 9/2018 |
| DE | 102018206803 A1 | 11/2019 |
| DE | 202015009764 U1 | 1/2020 |
| DE | 102019206856 A1 | 11/2020 |
| DE | 102019214995 A1 | 4/2021 |
| DE | 102019215913 A1 | 4/2021 |
| DE | 102021100122 A1 | 7/2021 |
| DE | 102020202740 A1 | 9/2021 |
| EP | 1364571 A2 | 11/2003 |
| EP | 1709859 A1 | 10/2006 |
| EP | 2006708 A1 | 12/2008 |
| EP | 2026161 A1 | 2/2009 |
| EP | 2163352 A2 | 3/2010 |
| EP | 2248409 A1 | 11/2010 |
| EP | 2269433 A1 | 1/2011 |
| EP | 2286653 A2 | 2/2011 |
| EP | 2296072 A2 | 3/2011 |
| EP | 2425700 A2 | 3/2012 |
| EP | 2586283 A1 | 5/2013 |
| EP | 2687077 A2 | 1/2014 |
| EP | 2693072 A1 | 2/2014 |
| EP | 2798937 A1 | 11/2014 |
| EP | 2823936 A2 | 1/2015 |
| EP | 2851760 A1 | 3/2015 |
| EP | 2870852 A1 | 5/2015 |
| EP | 2875712 A1 | 5/2015 |
| EP | 2717110 B1 | 8/2015 |
| EP | 2959764 A1 | 12/2015 |
| EP | 2960741 A2 | 12/2015 |
| EP | 2960742 A1 | 12/2015 |
| EP | 2783561 B1 | 3/2016 |
| EP | 2692220 B1 | 4/2016 |
| EP | 3047719 A1 | 7/2016 |
| EP | 3118016 A1 | 1/2017 |
| EP | 3165075 A1 | 5/2017 |
| EP | 3167699 A1 | 5/2017 |
| EP | 3167700 A1 | 5/2017 |
| EP | 3222132 A2 | 9/2017 |
| EP | 2883437 B1 | 3/2018 |
| EP | 3316067 A1 | 5/2018 |
| EP | 2743789 B1 | 6/2018 |
| EP | 3330824 A1 | 6/2018 |
| EP | 3366102 A1 | 8/2018 |
| EP | 3381258 A1 | 10/2018 |
| EP | 3479682 A1 | 5/2019 |
| EP | 2960100 B1 | 8/2019 |
| EP | 3520593 A1 | 8/2019 |
| EP | 3528213 A1 | 8/2019 |
| EP | 3534183 A1 | 9/2019 |
| EP | 3597090 A1 | 1/2020 |
| EP | 3660618 A1 | 6/2020 |
| EP | 3698620 A1 | 8/2020 |
| EP | 3725146 A1 | 10/2020 |
| EP | 3753387 A1 | 12/2020 |
| EP | 3791708 A1 | 3/2021 |
| EP | 3831544 A1 | 6/2021 |
| EP | 3837944 A1 | 6/2021 |
| EP | 3837945 A1 | 6/2021 |
| EP | 3837946 A1 | 6/2021 |
| EP | 3861911 A2 | 8/2021 |

(56) References Cited

FOREIGN PATENT DOCUMENTS

| | | |
|---|---|---|
| ES | 199267 U | 7/1975 |
| ES | 451339 A1 | 12/1977 |
| FR | 2771141 A1 | 5/1999 |
| FR | 3114537 A1 | 4/2022 |
| GB | 1288108 A | 9/1972 |
| GB | 1371959 A | 10/1974 |
| GB | 1451896 A | 10/1976 |
| GB | 1452308 A | 10/1976 |
| GB | 1489373 A | 10/1977 |
| GB | 1526519 A | 9/1978 |
| GB | 1557379 A | 12/1979 |
| GB | 2287170 A | 9/1995 |
| GB | 2295304 A | 5/1996 |
| GB | 2305840 A | 4/1997 |
| GB | 2419430 A | 4/2006 |
| GB | 2432922 A | 6/2007 |
| GB | 2433791 A | 7/2007 |
| GB | 90017056580001 | 5/2010 |
| GB | 2500168 A | 9/2013 |
| GB | 90024715400001 | 8/2014 |
| GB | 2513960 A | 11/2014 |
| GB | 2515556 A | 12/2014 |
| GB | 2516370 A | 1/2015 |
| GB | 90027012680001 | 5/2015 |
| GB | 90027378900001 | 10/2015 |
| GB | 90041329260001 | 9/2017 |
| GB | 90029638920001 | 3/2018 |
| GB | 90056318840001 | 9/2018 |
| GB | 2563347 A | 12/2018 |
| GB | 90040756950001 | 6/2019 |
| GB | 90073918420006 | 1/2020 |
| GB | 90080413210001 | 8/2020 |
| GB | 2581956 A | 9/2020 |
| GB | 90081876860001 | 10/2020 |
| GB | 6195686 | 5/2022 |
| JP | 2006/251883 A | 9/2006 |
| JP | 2006/268497 A | 10/2006 |
| JP | 2011/020615 A | 2/2011 |
| JP | 2015/149963 A | 8/2015 |
| KR | 2013/0044130 A | 5/2013 |
| KR | 2015/0125305 A | 11/2015 |
| SE | 538774 C2 | 11/2016 |
| SE | 540834 C2 | 11/2018 |
| SE | 542098 C2 | 2/2020 |
| SE | 543019 C2 | 9/2020 |
| SE | 543247 C2 | 10/2020 |
| SE | 2150377 A1 | 3/2021 |
| SE | 1951390 A1 | 6/2021 |
| SE | 2150080 A1 | 6/2021 |
| SE | 2050216 A1 | 8/2021 |
| SE | 543941 C2 | 9/2021 |
| SE | 543943 C2 | 9/2021 |
| SE | 2150193 A1 | 10/2021 |
| SE | 2150394 A1 | 10/2021 |
| WO | WO91/06435 A1 | 5/1991 |
| WO | WO97/49528 A1 | 12/1997 |
| WO | WO00/60921 A1 | 10/2000 |
| WO | WO00/74466 A1 | 12/2000 |
| WO | WO03/040846 A1 | 5/2003 |
| WO | WO03/103375 A1 | 12/2003 |
| WO | WO2005/002320 A1 | 1/2005 |
| WO | WO2006/094887 A2 | 9/2006 |
| WO | WO2006/094889 A1 | 9/2006 |
| WO | WO2006/102740 A1 | 10/2006 |
| WO | WO2007/091967 A1 | 8/2007 |
| WO | WO2007/140930 A1 | 12/2007 |
| WO | WO2008/015479 A2 | 2/2008 |
| WO | WO2008/060689 A2 | 5/2008 |
| WO | WO2008/068494 A1 | 6/2008 |
| WO | WO2008/095715 A2 | 8/2008 |
| WO | WO2008/144135 A1 | 11/2008 |
| WO | WO2009/036644 A1 | 3/2009 |
| WO | WO2009/071379 A1 | 6/2009 |
| WO | WO2009/077239 A1 | 6/2009 |
| WO | WO2009/083319 A1 | 7/2009 |
| WO | WO2010/077198 A1 | 7/2010 |
| WO | WO2010/130479 A2 | 11/2010 |
| WO | WO2011/115536 A1 | 9/2011 |
| WO | WO2012/047176 A1 | 4/2012 |
| WO | WO2013/010475 A1 | 1/2013 |
| WO | WO2013/011252 A1 | 1/2013 |
| WO | WO2013/025135 A1 | 2/2013 |
| WO | WO2013/064301 A1 | 5/2013 |
| WO | WO2013/081516 A1 | 6/2013 |
| WO | WO2013/083311 A1 | 6/2013 |
| WO | WO2013/102417 A1 | 7/2013 |
| WO | WO2013/107266 A1 | 7/2013 |
| WO | WO2013/107374 A1 | 7/2013 |
| WO | WO2013/125992 A1 | 8/2013 |
| WO | WO2013/185622 A1 | 12/2013 |
| WO | WO2014/007694 A1 | 1/2014 |
| WO | WO2014/056443 A1 | 4/2014 |
| WO | WO2014/071860 A1 | 5/2014 |
| WO | WO2014/079363 A1 | 5/2014 |
| WO | WO2014/079632 A1 | 5/2014 |
| WO | WO2014/086267 A1 | 6/2014 |
| WO | WO2014/173290 A1 | 10/2014 |
| WO | WO2015/010277 A1 | 1/2015 |
| WO | WO2015/053488 A1 | 4/2015 |
| WO | WO2015/144998 A1 | 10/2015 |
| WO | WO2015/154822 A1 | 10/2015 |
| WO | WO2015/161829 A1 | 10/2015 |
| WO | WO2015/169343 A1 | 11/2015 |
| WO | WO2015/172831 A1 | 11/2015 |
| WO | WO2015/182514 A1 | 12/2015 |
| WO | WO2015/192903 A1 | 12/2015 |
| WO | WO2016/038512 A1 | 3/2016 |
| WO | WO2016/097891 A1 | 6/2016 |
| WO | WO2016/097892 A1 | 6/2016 |
| WO | WO2016/097897 A1 | 6/2016 |
| WO | WO2016/103070 A1 | 6/2016 |
| WO | WO2016/108104 A1 | 7/2016 |
| WO | WO2016/109721 A1 | 7/2016 |
| WO | WO2016/119751 A1 | 8/2016 |
| WO | WO2016/127923 A1 | 8/2016 |
| WO | WO2016/131399 A1 | 8/2016 |
| WO | WO2016/184398 A1 | 11/2016 |
| WO | WO2017/101882 A1 | 6/2017 |
| WO | WO2017/123137 A1 | 7/2017 |
| WO | WO2017/129551 A1 | 8/2017 |
| WO | WO2017/133625 A1 | 8/2017 |
| WO | WO2017/148438 A1 | 9/2017 |
| WO | WO2017/167207 A1 | 10/2017 |
| WO | WO2017/181995 A1 | 10/2017 |
| WO | WO2017/186372 A1 | 11/2017 |
| WO | WO2017/190784 A1 | 11/2017 |
| WO | WO2017/198222 A1 | 11/2017 |
| WO | WO2017/206950 A1 | 12/2017 |
| WO | WO2017/211308 A1 | 12/2017 |
| WO | WO2018/001340 A1 | 1/2018 |
| WO | WO2018/010650 A1 | 1/2018 |
| WO | WO2018/028624 A1 | 2/2018 |
| WO | WO2018/057250 A1 | 3/2018 |
| WO | WO2018/057452 A2 | 3/2018 |
| WO | WO2018/057589 A1 | 3/2018 |
| WO | WO2018/059323 A1 | 4/2018 |
| WO | WO2018/103178 A1 | 6/2018 |
| WO | WO2018/117190 A1 | 6/2018 |
| WO | WO2018/125222 A1 | 7/2018 |
| WO | WO2018/127209 A1 | 7/2018 |
| WO | WO2018/146518 A1 | 8/2018 |
| WO | WO2018/153599 A1 | 8/2018 |
| WO | WO2018/174777 A1 | 9/2018 |
| WO | WO2018/185376 A1 | 10/2018 |
| WO | WO2018/199829 A1 | 11/2018 |
| WO | WO2019/034382 A1 | 2/2019 |
| WO | WO2019/063012 A1 | 4/2019 |
| WO | WO2019/080935 A1 | 5/2019 |
| WO | WO2019/096052 A1 | 5/2019 |
| WO | WO2019/096463 A1 | 5/2019 |
| WO | WO2019/109982 A1 | 6/2019 |
| WO | WO2019/110013 A1 | 6/2019 |
| WO | WO2019/144916 A1 | 8/2019 |
| WO | WO2019/157841 A1 | 8/2019 |

(56) References Cited

FOREIGN PATENT DOCUMENTS

| | | |
|---|---|---|
| WO | WO2019/158090 A1 | 8/2019 |
| WO | WO2019/158452 A1 | 8/2019 |
| WO | WO2019/168069 A1 | 9/2019 |
| WO | WO2019/170142 A1 | 9/2019 |
| WO | WO2019/206274 A1 | 10/2019 |
| WO | WO2019/238099 A1 | 12/2019 |
| WO | WO2020/020652 A1 | 1/2020 |
| WO | WO2020/063811 A1 | 4/2020 |
| WO | WO2020/064087 A1 | 4/2020 |
| WO | WO2020/093970 A1 | 5/2020 |
| WO | WO2020/093992 A1 | 5/2020 |
| WO | WO2020/098666 A1 | 5/2020 |
| WO | WO2020/098670 A1 | 5/2020 |
| WO | WO2020/103696 A1 | 5/2020 |
| WO | WO2020/104242 A1 | 5/2020 |
| WO | WO2020/107007 A1 | 5/2020 |
| WO | WO2020/107772 A1 | 6/2020 |
| WO | WO2020/108267 A1 | 6/2020 |
| WO | WO2020/108550 A1 | 6/2020 |
| WO | WO2020/114415 A1 | 6/2020 |
| WO | WO2020/125450 A1 | 6/2020 |
| WO | WO2020/134667 A1 | 7/2020 |
| WO | WO2020/148138 A1 | 7/2020 |
| WO | WO2020/155853 A1 | 8/2020 |
| WO | WO2020/156519 A1 | 8/2020 |
| WO | WO2020/156684 A1 | 8/2020 |
| WO | WO2020/156851 A1 | 8/2020 |
| WO | WO2020/161021 A1 | 8/2020 |
| WO | WO2020/170933 A1 | 8/2020 |
| WO | WO2020/193513 A1 | 10/2020 |
| WO | WO2020/199055 A1 | 10/2020 |
| WO | WO2020/218960 A1 | 10/2020 |
| WO | WO2020/256619 A1 | 12/2020 |
| WO | WO2020/259586 A1 | 12/2020 |
| WO | WODM/212022 | 12/2020 |
| WO | WO2021/013173 A1 | 1/2021 |
| WO | WO2021/023227 A1 | 2/2021 |
| WO | WO2021/031418 A1 | 2/2021 |
| WO | WO2021/031423 A1 | 2/2021 |
| WO | WO2021/031451 A1 | 2/2021 |
| WO | WO2021/036033 A1 | 3/2021 |
| WO | WO2021/036077 A1 | 3/2021 |
| WO | WO2021/047063 A1 | 3/2021 |
| WO | WO2021/047068 A1 | 3/2021 |
| WO | WO2021/047602 A1 | 3/2021 |
| WO | WO2021/068370 A1 | 4/2021 |
| WO | WO2021/068928 A1 | 4/2021 |
| WO | WO2021/078220 A1 | 4/2021 |
| WO | WO2021/082817 A1 | 5/2021 |
| WO | WO2021/088551 A1 | 5/2021 |
| WO | WO2021/088553 A1 | 5/2021 |
| WO | WO2021/088558 A1 | 5/2021 |
| WO | WO2021/093474 A1 | 5/2021 |
| WO | WO2021/093526 A1 | 5/2021 |
| WO | WO2021/093851 A1 | 5/2021 |
| WO | WO2021/098382 A1 | 5/2021 |
| WO | WO2021/103803 A1 | 6/2021 |
| WO | WO2021/103804 A1 | 6/2021 |
| WO | WO2021/110414 A1 | 6/2021 |
| WO | WO2021/114988 A1 | 6/2021 |
| WO | WO2021/115364 A1 | 6/2021 |
| WO | WO2021/136234 A1 | 7/2021 |
| WO | WO2021/139389 A1 | 7/2021 |
| WO | WO2021/139683 A1 | 7/2021 |
| WO | WO2021/139685 A1 | 7/2021 |
| WO | WO2021/139809 A1 | 7/2021 |
| WO | WO2021/147494 A1 | 7/2021 |
| WO | WO2021/147792 A1 | 7/2021 |
| WO | WO2021/164738 A1 | 8/2021 |
| WO | WO2021/175331 A1 | 9/2021 |
| WO | WO2021/180123 A1 | 9/2021 |
| WO | WO2021/190627 A1 | 9/2021 |
| WO | WO2021/208308 A1 | 10/2021 |
| WO | WO2021/215980 A1 | 10/2021 |
| WO | WODM/217452 | 10/2021 |
| WO | WO2021/225494 A1 | 11/2021 |
| WO | WO2021/230791 A1 | 11/2021 |
| WO | WO2021/233205 A1 | 11/2021 |
| WO | WO2022/042362 A1 | 3/2022 |

OTHER PUBLICATIONS

US 8,275,482 B2, 09/2012, Casey et al. (withdrawn)
US 10,675,758 B2, 06/2020, Cohen et al. (withdrawn)
US 10,798,874 B2, 10/2020, Balutis et al. (withdrawn)
US 10,952,370 B2, 03/2021, Sebastian et al. (withdrawn)
Li B. et al: "Development and Testing of a Two-UAV Communication Relay System—PMC" MDPI sensors, Oct. 13, 2016 (Oct. 13, 2016), pp. 1-29, XP093029112, Retrieved from the Internet: URL: https://www.ncbi.nlm.nih.gov/pmc/articles/PMC5087484/ [retrieved on Mar. 6, 2023].
Dynia Miroslaw et al: "Maintaining Communication Between an Explorer and a Base Station" In: "IFIP. International Federation for Information Processing", Dec. 31, 2006 (Dec. 31, 2006), XP093029044, ISSN: 1571-5736 vol. 216, pp. 137-146, DOI: 10.1007/978-0-387-34733-2 14.
European Search Report Corresponding with Application No. EP22206778 on Mar. 7, 2023 (3 pages).
European Search Report Corresponding with Application No. EP22206349 on Mar. 7, 2023 (3 pages).

* cited by examiner

ROBOTIC LAWN MOWERS

CROSS-REFERENCE TO RELATED APPLICATIONS

The present application claims priority to U.S. Provisional Patent Application 63/278,079 filed on Nov. 10, 2021, the disclosure of which is incorporated by reference herein in its entirety.

FIELD

The present disclosure relates generally to robotic lawn mowers, and more particularly to communication between and amongst a plurality of robotic lawn mowers

BACKGROUND

Traditionally, lawn mowing was performed by a human operator. The operator moved a lawn mowing machine around a work area. Over time, it has become common to replace the human operator with a robotic lawn mower. Robotic lawn mowers are capable of mowing operations largely without the intervention of operators. In this regard, they reduce time and cost associated with mowing. However, robotic lawn mowers are limited in their mowing capacity as they generally lack effective communication for operating in a group.

Accordingly, improved mowing systems which utilize a plurality of robotic lawn mowers would be desired in the art. In particular, mowing systems which allow a plurality of robotic lawn mowers to effectively communicate with one another would be advantageous.

SUMMARY

Aspects and advantages of the present disclosure will be set forth in part in the following description, or may be obvious from the description, or may be learned through practice of the technology.

In accordance with one embodiment, a method of operating a mowing system is provided. The method includes mowing within a work area, wherein mowing is performed by a robotic lawn mower, and wherein the work area comprises a plurality of base stations each configured to charge the robotic lawn mower; and determining when to charge the robotic lawn mower in view of a current charge level and a current location of the robotic lawn mower.

In accordance with one embodiment, a method of operating a mowing system is provided. The method includes mowing within a work area, wherein mowing is performed by a plurality of robotic lawn mowers, and wherein the work area comprises a plurality of base stations each configured to charge the plurality of robotic lawn mowers; and determining when to charge at least one of the plurality of robotic lawn mowers in view of a current charge level and a current location of the at least one of the plurality of robotic lawn mowers, and further in view of a current occupancy of each of the plurality of base stations.

In accordance with one embodiment, a method of operating a mowing system is provided. The method includes mowing within a work area using a work plan, wherein mowing is performed by a robotic lawn mower, and wherein the work area comprises a plurality of base stations each configured to charge the robotic lawn mower; determining when to charge the robotic lawn mower in view of a current charge level and a current location of the robotic lawn mower; determining energy consumption of the robotic lawn mower using the work plan; and informing future determinations of when to charge the robotic lawn mower in view of the determined energy consumption of the robotic lawn mower using the work plan.

These and other features, aspects and advantages of the present disclosure will become better understood with reference to the following description and appended claims. The accompanying drawings, which are incorporated in and constitute a part of this specification, illustrate embodiments of the technology and, together with the description, serve to explain the principles of the technology.

Other aspects of the embodiments will become apparent by consideration of the detailed description and accompanying drawings.

BRIEF DESCRIPTION OF THE DRAWINGS

A full and enabling disclosure of the present disclosure, including the best mode of making and using the present systems and methods, directed to one of ordinary skill in the art, is set forth in the specification, which makes reference to the appended figures, in which.

DETAILED DESCRIPTION

Figure 1:
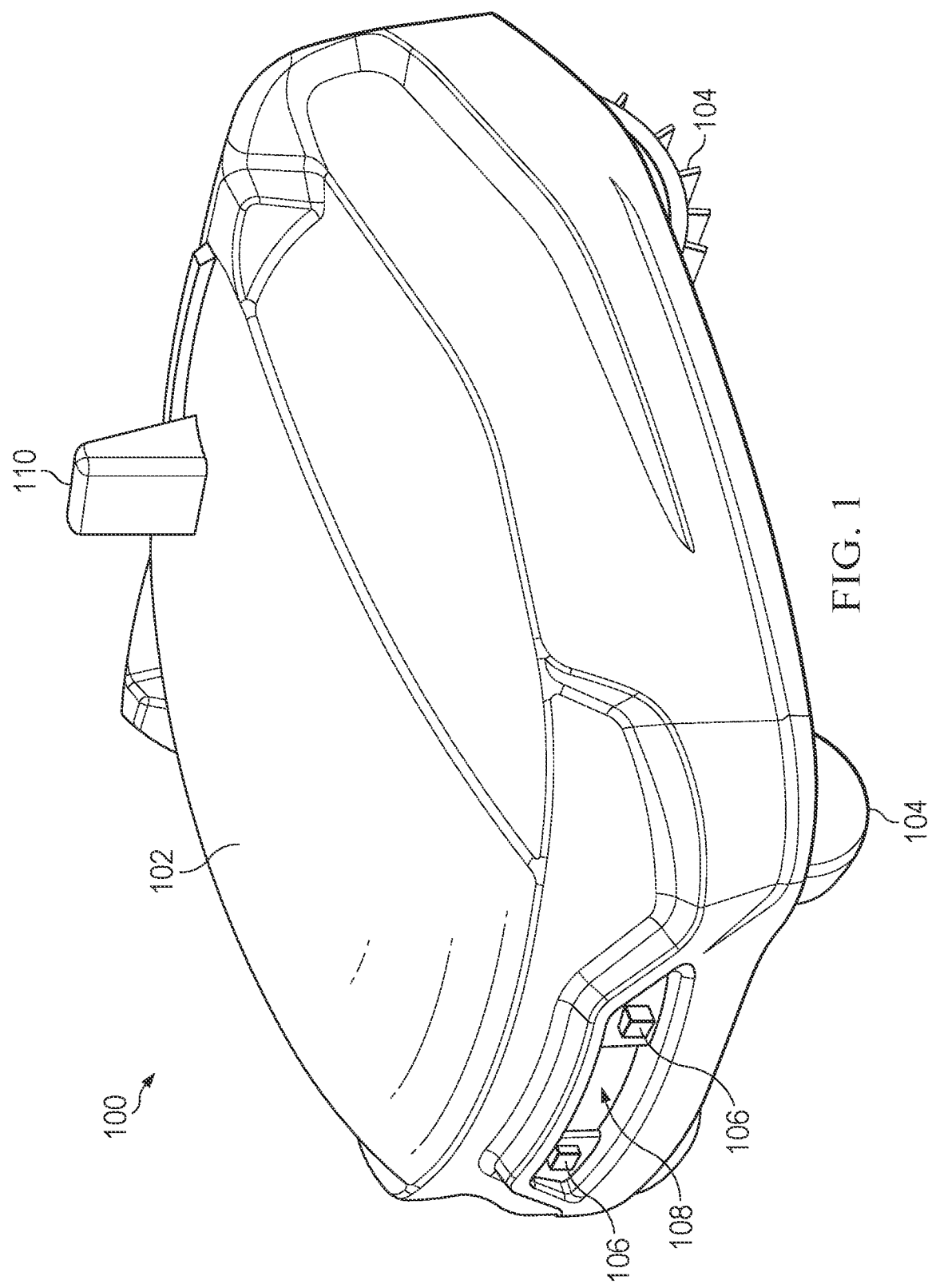
FIG. 1 is a perspective view of a robotic lawn mower in accordance with an exemplary embodiment of the present disclosure.

Reference now will be made in detail to embodiments of the present disclosure, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive—or and not to an exclusive—or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, systems and methods described in accordance with one or more embodiments herein can include one or more robotic lawn mowers and a plurality of base stations. Operating protocols can be initiated which determine when the mower(s) charge and even at which of the plurality of base stations charging occurs at. In an embodiment, the determination to charge is based on both the current location of the mower and a charge level of the mower. In a more particular embodiment, the determination can be made further in view of determined distances between the mower(s) and the base stations, updated information from previous mowing operations in the work area, the current work plan, occupancy status of the base stations, or any combination thereof. These and other features of the mowing systems and methods described herein will become apparent in light of the embodiments that follow.

By way of non-limiting example, the principal robotic lawn mower(s) can communicate between a base station, which may be disposed at the work area, and the secondary robotic lawn mower(s), acting, e.g., like a middleman between the base station and the secondary robotic lawn mower(s); assigning action items and protocols to the secondary robotic lawn mower(s); delegating responsibilities to the secondary robotic lawn mower(s); relaying information from the secondary robotic lawn mower(s) to the base station or between secondary robotic lawn mowers; storing (or even processing) information associated with one or more of the secondary robotic lawn mower(s); handling disagreements or issues arising between multiple secondary robotic lawn mowers; observing (and optionally documenting) actions taken by the secondary robotic lawn mower(s); or the like.

In certain instances, the principal and secondary robotic lawn mowers can be fungible, i.e., include the same hardware and components as one another. In this regard, hierarchical assignment may be designated without deference to structural, hardware, or even software differentiation between the robotic lawn mowers. In such a manner, the principal/secondary hierarchical arrangement may be rearrangeable in response to an operational event. For example, when the principal robotic lawn mower is operating at a sub-threshold charge level, principal status can be delegated to one of the secondary robotic lawn mowers. In certain instances, this designation can be temporarily assigned until the previous principal robotic lawn mower reaches a desired charge, at which time the principal designation can revert to the previous principal robotic lawn mower. In other instances, this designation can remain until such time that the newly appointed principal robotic lawn mower requires charging or another operational event occurs.

Using hierarchical schemas, the mowing system can streamline operation of a plurality of robotic lawn mowers without requiring human interaction. In certain instances, machine learning may be implemented to acquire information about the mowing system and improve operational capacity. Machine learning may happen centrally, e.g., at the principal robotic lawn mower or base station, or be decentralized, e.g., split between two or more of the robotic lawn mowers or between one of the robotic lawn mowers and the base station.

These and other features of the mowing systems and methods described herein will become apparent in light of the embodiments that follow.

FIG. 1 illustrates a view of an exemplary robotic lawn mower 100 as seen in accordance with an exemplary embodiment of the present disclosure. The mower 100 is autonomous, or at least semi-autonomous. The mower 100 can be utilized within a work area to perform a work operation, such as mow grass within the work area, perform trimming operations within the work area, perform hedging operations in the work area, or the like. The mower 100 can generally include a body 102 and a walking element including, e.g., a plurality of wheels 104 coupled to the body 102.

In an embodiment, the mower 100 can further include one or more sensors 106 which can detect an aspect of the mower 100 itself or the surrounding environment. In the depicted embodiment, the sensors 106 are disposed on an outer surface of the body 102. In another embodiment, the sensors 106 may be disposed under the body 102. In another embodiment, the sensors 106 may be exposed, e.g., at one or more openings 108 in the body 102. By way of non-limiting example, the sensors 106 may include one or more of visual sensors, audio sensors, touch sensors such as capacitive sensors, radar sensors, temperature sensors, or the like.

In an embodiment, the mower 100 can include a communication element 110. The communication element 110 can include a wireless communication device. The communication element 110 can communicate with other wireless communication devices, such as other wireless communication devices disposed nearby, such as other wireless communication devices disposed within the work area. While depicted on an exterior portion of the mower 100, in accordance with an embodiment, at least a portion of the communication element 110, such as the entire communication element 110, can be disposed at least partially within the body 102 of the mower 100.

Figure 2:
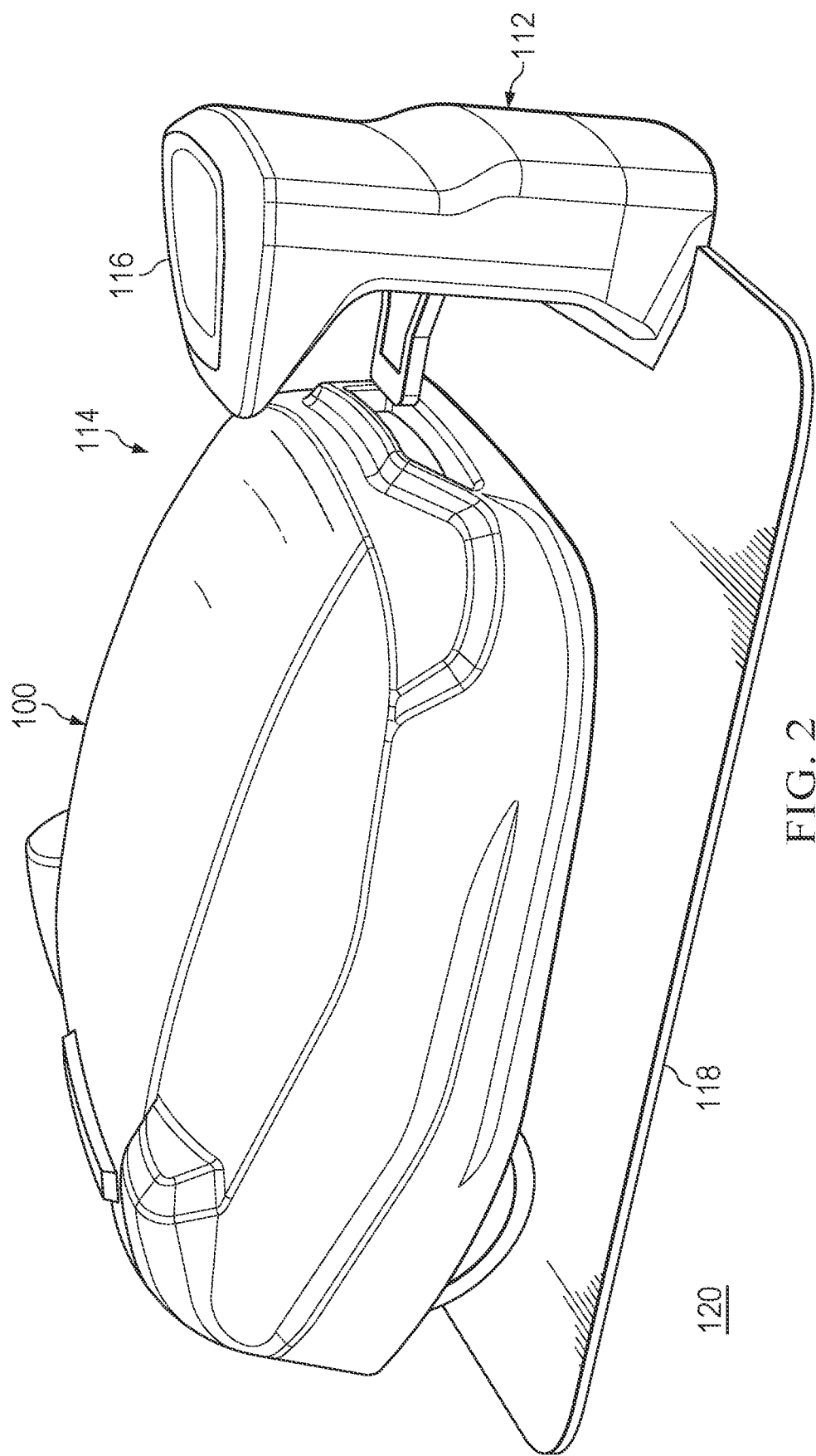
FIG. 2 is a perspective view of a mowing system including the robotic lawn mower and a base station in accordance with an exemplary embodiment of the present disclosure.

FIG. 2 depicts an exemplary embodiment of the mower 100 at a base station 112. The base station 112 can generally include a receiving area 114 and a dock 116 which can interface with the mower 100. In the depicted embodiment, the receiving area 114 includes a plate 118 upon which the mower 100 can reside when interfaced with the dock 116. In other embodiments, the receiving area 114 can be a portion of a work area 120 in the surrounding environment (i.e., without the plate 118).

One or more base stations 112 can be disposed within or near the work area 120. In certain instances, the base station(s) 112 may be disposed near a perimeter of the work area 120 to allow for electrical connectivity.

Figure 3:
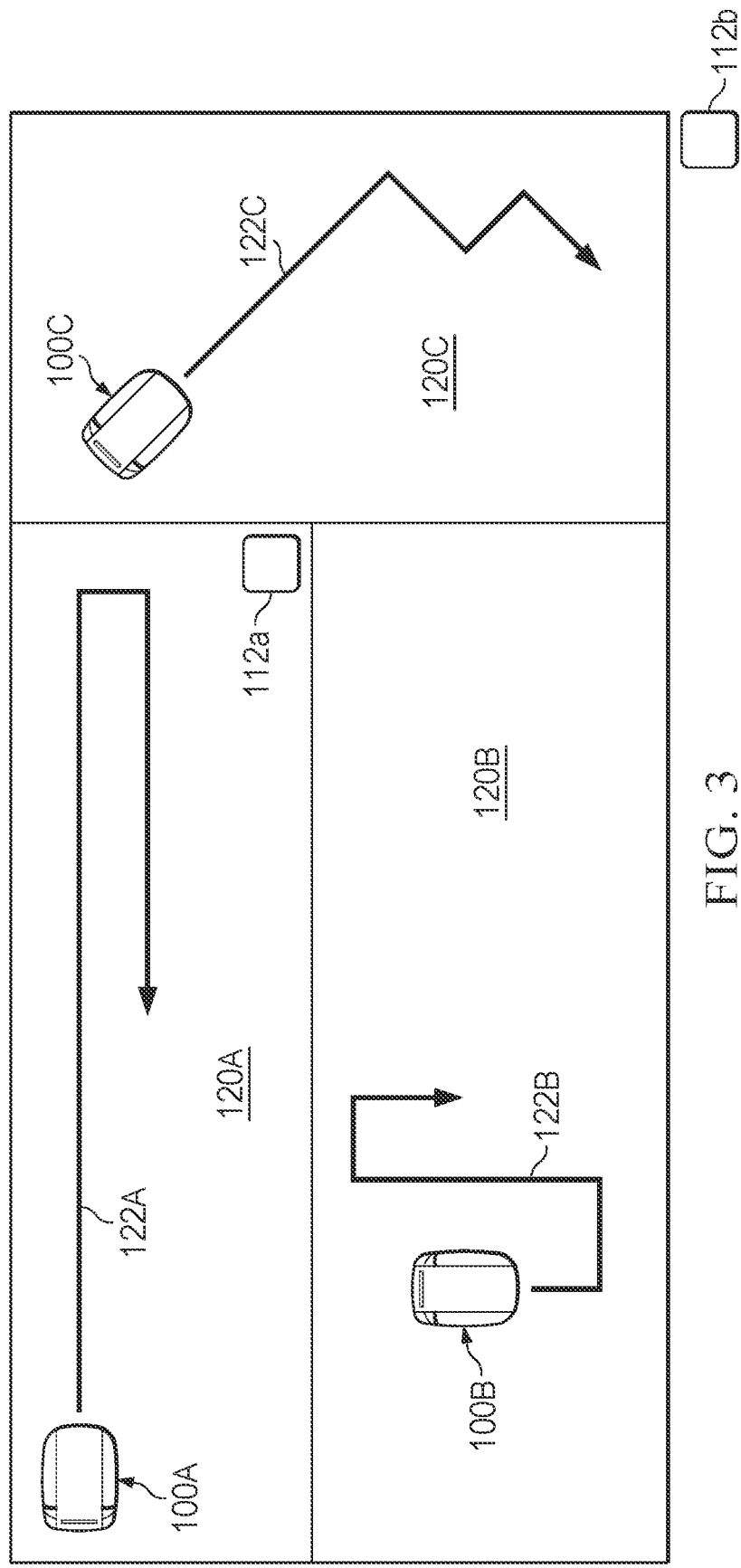
FIG. 3 is a schematic of a work area including a plurality of zones in accordance with an exemplary embodiment of the present disclosure.

FIG. 3 illustrates an exemplary work area 120 including three different zones—a first zone 120A, a second zone 120B, and a third zone 120C. It should be understood that the number, size and shape of the zones 120A, 120B, and 120C can vary without departing from the scope of this disclosure. A first mower 100A can be disposed in a first zone 120A, a second mower 100B can be disposed in a second zone 120B, and a third mower 100C can be disposed in a third zone 120C. In certain instances, the first, second, and third mowers, 100A, 100B, and 100C can generally remain in their respective zones and perform work operations therein. The first mower 100A can be performing an operation, e.g., a mowing operation, while travelling along path 122A. The second mower 100B can be performing a same or different operation while travelling along path 122B. The third mower 100 an also be performing a same or different operation while travelling along path 122C.

A first base station 112a and a second base station 112b can be disposed at the work area 120. The first base station 112a is depicted in the first zone 120A and the second base station 112b is disposed outside of zones 120A, 120B, and 120C but within the surrounding environment. As all three mowers 100A, 100B, and 100C require energy (e.g., recharging), it will be necessary for at least the second and third mowers 100B and 100C to leave their respective zones 120B and 120C to restore energy levels, e.g., charge. Even the first mower 100A may not necessarily charge at the base station 112A despite the base station 112A being disposed in the first zone 120A with the first mower 100A.

Figure 4:
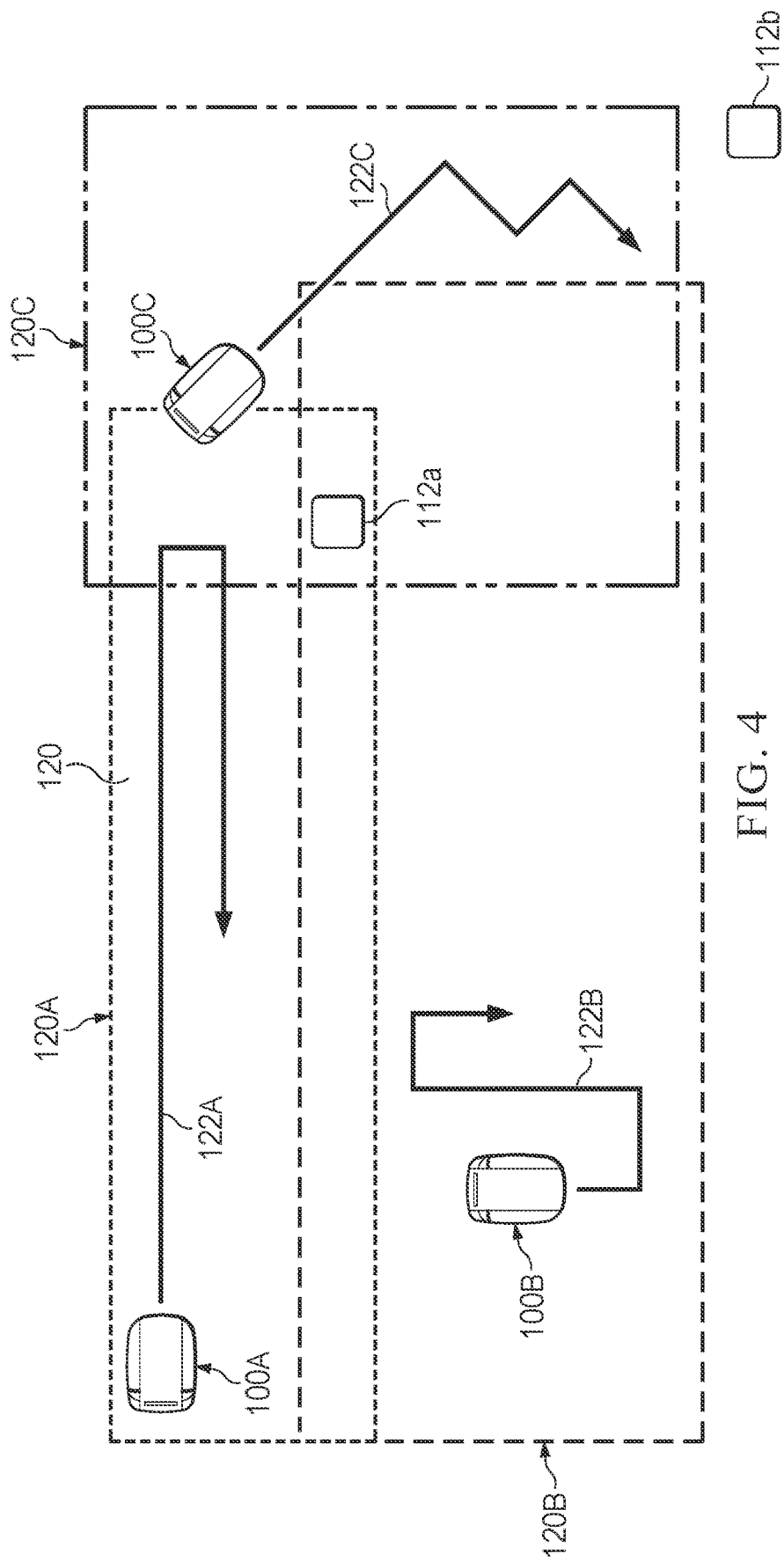
FIG. 4 is a schematic of a work area including a plurality of zones in accordance with an exemplary embodiment of the present disclosure.

FIG. 4 illustrates another exemplary work area 120 including three zones—a first zone 120A, a second zone 120B, and a third zone 120C. However, unlike the work area 120 depicted in FIG. 3, the work area 120 depicted in FIG. 4 includes overlapping zones 120A, 120B, and 120C. While only small portion of the zones 120A, 120B, and 120C are shown overlapping, in other embodiments the degree of overlap can be substantially larger. For example, in a particular embodiment the overlap between the zones 120A, 120B, and 120C can be approximately 100%, or even 100%. In an embodiment, the zones 120A, 120B, and 120C can overlap at differing degrees. For instance, by way of non-limiting example, 20% of the first zone 120A may overlap the second zone 120B while 40% of the first zone 120A may overlap the third zone 120C. By way of another example, 15% of the first zone 120A can overlap each of the second and third zones 120B and 120C, 10% of the second zone 120B can overlap the first zone 120A, and 50% of the third zone 120C can overlap the first zone 120A. In an embodiment, two of the zones may not overlap while two of the other zones overlap. Further scenarios are possible.

Similar to the embodiment depicted in FIG. 3, the first mower 100A is disposed in the first zone 120A, the second mower 100B is disposed in the second zone 120B, and the third mower 100C is disposed in the third zone 120C of the work area 120. However, given that the zones 120A, 120B, and 120C overlap, the first, second, and third mowers 100A, 100B, and 100C are thus operating in potentially conflicting environments where two or more of the robots might interact with one another or even collide. Hierarchical schemas may prevent these problems.

The mowers 100 described herein can generally operate using an energy source that becomes depleted during use. For example, in an embodiment, the mowers 100 utilize one or more energy storage units, e.g., batteries, to power a rotatable blade and propel the mower 100. As the batteries are used, charge levels decrease. At a threshold charge, it becomes necessary to recharge the batteries in order to continue the mowing operation. Accordingly, an operating protocol for charging the mowers must be implemented.

Figure 5:
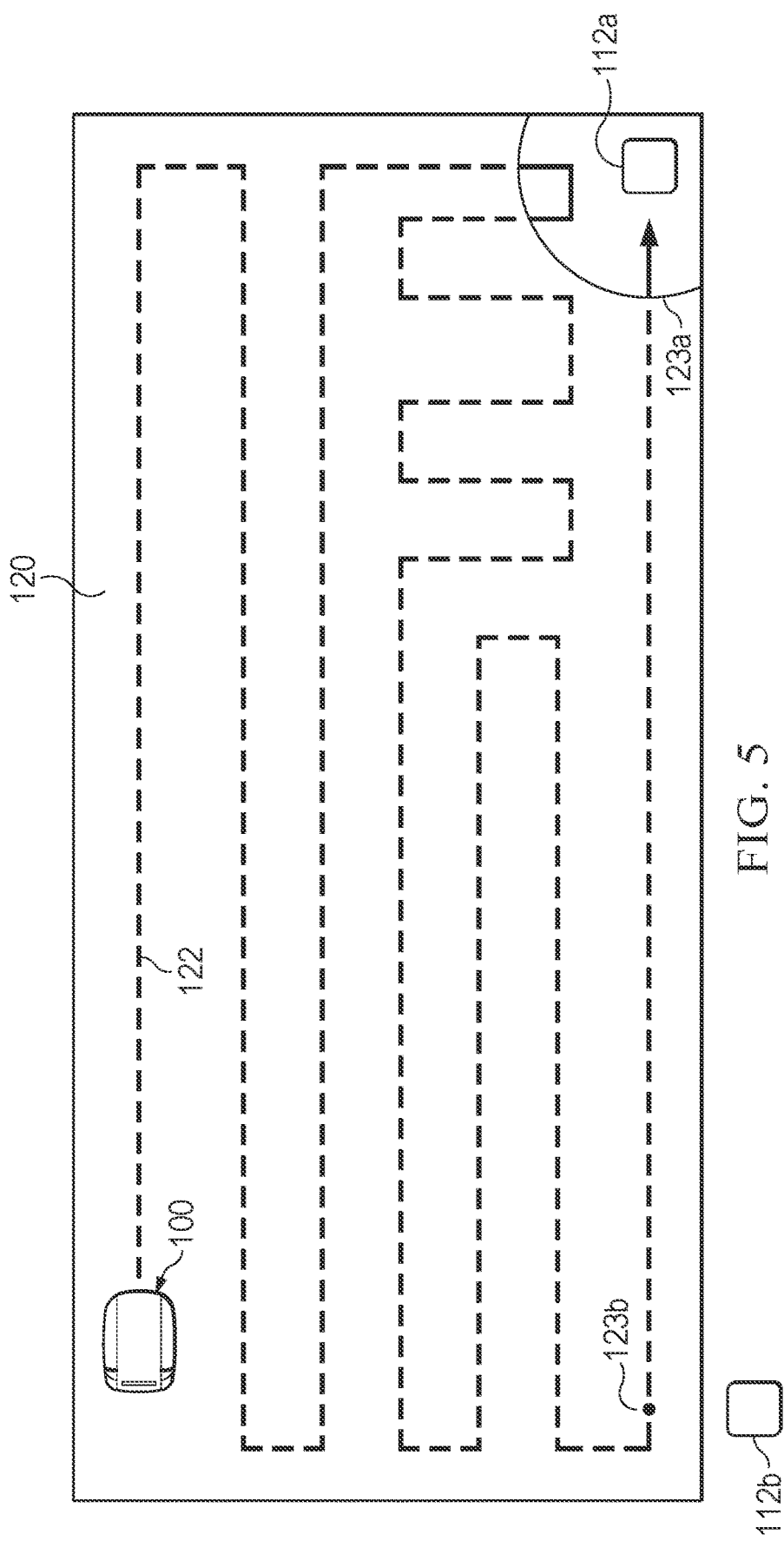
FIG. 5 is a schematic view of a work area including a robotic lawn mower operating on a work path and a plurality of base stations in accordance with an exemplary embodiment of the present disclosure.

FIG. 5 illustrates a schematic view of a mower 100 disposed in the work area 120 and operating in view of a work plan including a work path 122. The work plan may also include, for example, instructions to engage or disengage the mower blade, raise, or lower the mower blade height, increase or decrease mower blade speed, increase or decrease propelling speed, the like, or any combination thereof.

The exemplary work path 122 depicted in FIG. 5 includes a generally winding path that has a first path portion 123a disposed adjacent to the first base station 112a and a second path portion 123b disposed adjacent to the second base station 112b. It should be understood that the exemplary work path 122 depicted in FIG. 5 is shown only for purpose of illustration and does not limit the shapes and configurations of the potential work paths 122 contemplated herein.

The first and second path portions 123a and 123b can each include locations or areas of the work path 122 that are within a range of the base stations 112a and 112b, respectively. This can include, for instance, areas along the work path 122 which are disposed within a prescribed distance of the base stations 112, predetermined point locations along the work path 122, predetermined areal locations along the work path 122, or any combination thereof. By way of example, the first path portion 123a is shown as an aerial location defined by a distance relative to the first base station 112a. The portions of the work path 122 disposed within the first path portion 123a are shown in solid lines for understanding. The second path portion 123b is shown as a predetermined point location within the work area 120.

When the mower 100 encounters either of the path portions 123a or 123b, a determination may be made about whether to charge the mower 100 at the associated base station 112a or 112b, respectively, or to continue along the work path 122. In an embodiment, this determination of whether to charge at the nearby base station 112, i.e., when to charge, is made in view of a current charge level of the mower 100. In another embodiment, this determination is made in view of the work plan, e.g., the work path 122. More particularly, the determination may be made in view of the distance along the work path 122 between the current location and the next path portion, e.g., path portion 123b. If the distance to the next path portion 123b is less than a threshold value such that the mower 100 can reach the second base station 112b, the determination may be made to pass through the first path portion 123a and instead move to the second path portion 123b. Once reaching the second path portion 123b, the mower 100 can either charge, or determine whether to pass through the second path portion 123b, instead moving to a third path portion (not illustrated). In certain instances, the third path portion (not illustrated) may even be the first path portion 123a as shown by the work path 122 reentering the first path portion 123a after passing through the second path portion 123b.

In certain instances, the mowing system described herein can operate using a plurality of mowers as described above. In accordance with an embodiment, the determination of when to charge the mower 100 can be made in view of a current occupancy status of the base station 112a or 112b disposed adjacent to the path portion 123a or 123b, respectively. By way of non-limiting example, if the mower 100 is entering the first path portion 123a associated with the first base station 112a (and the first base station 112a is not occupied by another mower) and has enough charge to make it to the second path portion 123b associated with the second base station 112b (and the second base station 112b is occupied by another mower) but the mower 100 does not have enough charge to make it to the third path portion, the mower 100 may stop at the first base station 112a to recharge. In certain instances, recharge at the first base station 112a may include a full recharge. In other instances, recharge at the second base station 112a may include only a partial recharge. By way of example, if the mower 100 only has 100 yards remaining on its work path 122 before completing the mowing operation and enough energy to mow only 75 yards, the time the mower 100 spends at the first base station 112a may be just enough to get the mower to 100 yards of mowing charge (and an optional additional safety charge amount). In this regard, the mower 100 can complete the mowing operation quicker and receive a full charge at a future base station 112 without leaving a portion of the work path 122 un-mowed for an extended duration.

Figure 6:
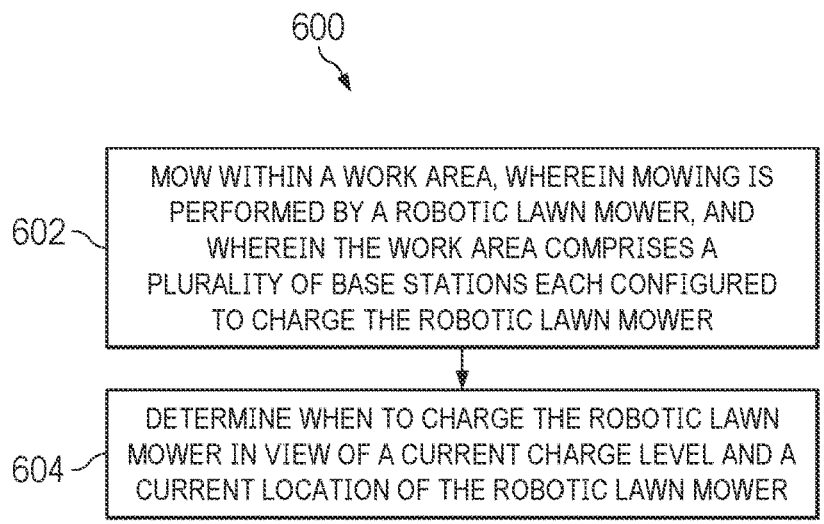
FIG. 6 is a flow chart of a method of operating a mowing system in accordance with an exemplary embodiment of the present disclosure.

FIG. 6 is a flow chart 600 of a method of operating a mowing system in accordance with an embodiment. The method 600 can generally include a step 602 of mowing within a work area using a robotic lawn mower. The work area includes a plurality of base stations each configured to charge the robotic lawn mower. The step 602 of mowing within the work area can be performed using a work plan. The work plan can include instructions informing aspects of operation of the mower. For instance, the instructions can inform blade height, blade speed, motor current draw, propulsion speeds, and the like. The instructions can generate a work path along which the mower travels. The mower can utilize one or more implements to stay on the work path. For example, the mower may utilize global positioning satellite (GPS) systems to navigate along the work path, e.g., using way points or the like. In certain instances, the mower can utilize a compass, an odometer, or the like which may allow the mower to maintain a preset course over a prescribed distance and adjust course as necessary to stay on the work path.

In certain instances, the step 602 may be performed with input from a centralized, or otherwise external, source. For example, one or more of the base stations may communicate with the mower. Alternatively, a smart device, such as a smart phone, may be operated by a user to control the mower at step 602. For example, the user may enter a preferred navigation path or protocol which can be communicated to the mower for performing step 602.

It should be noted that the location of the base stations within the work area may be preset prior to the mowing operation. The locations of the base stations may be either manually entered into the mowing system or determined using a base station location discovery protocol. In such a manner, step 602 can be performed with the relative positions of the mower and the base stations being known.

During mowing operations, the mower necessarily expends energy. As such, it is necessary to charge the mower. For large work areas, charging may be performed prior to completion of the mowing operation. For smaller work areas, it may be possible to complete the mowing operation on a single charge. Regardless, determining the proper charging location, e.g., base station, for charging may be necessary when the mowing system includes a plurality of base stations. In this regard, the method 600 can further include a step 604 of determining when to charge the robotic lawn mower. The step 604 may be performed in view of both a current charge level and a current location of the mower. In this regard, the decision to charge the mower is not single-factor dependent. Instead, a multi-factor determination protocol is utilized which determines not only the charge level of the mower but also the current location of the mower. If the mower is within a prescribed distance, or at a predetermined location, relative to one of the base stations and the charge level is below a certain threshold, the mower may dock with the base station to charge. If, however, the mower is not within the prescribed distance, or at the predetermined location, or if the charge level is not below the threshold, the mower may continue with the mowing operation as described at step 602.

Step 604 may be performed by the mower. That is, the mower may continuously or periodically check charge level. For example, the mower may check its charge level when entering a path portion associated with a base station. As described above, the mower can then determine whether to charge at that base station.

Step 604 may alternatively be performed by the base station. That is, the base station may monitor the charge level of the mower. By way of example, the base station can determine the charge level of the mower when the mower enters the path portion associated with the base station. If the charge is below the threshold, the base station can instruct the mower to dock with and charge at the base station.

Step 604 may alternatively be performed by a combination of the mower and the base station. For instance, by way of non-limiting example, the base station can monitor the position of the mower and the mower can monitor its own charge level. The mower and base station can communicate this information therebetween and together arrive at a decision to charge or continue mowing.

In an embodiment, the method 600 can further include a step of monitoring the current location of the mower and determining a distance between the current location and at least one of the plurality of base stations. This step can be performed by either, or both, of the base station and mower. In an embodiment, determining the distance between the current location and at least one of the plurality of base stations can include determining a first distance between the current location and a first base station and determining a second distance between the current location and a second base station. In certain instances, the first and second distances can be distances as measured along the work path. In other instances, the first and second distances can be straight-line distances, i.e., shortest route distances. While the determination of when to charge described in the method 600 may be performed while keeping the mower on the work path, in some instances the mower can deviate from the work path to arrive at the base station for charging.

The first and second distances can be used to determine when to charge the mower. For instance, if the second distance exceeds a current capacity of the mower, the mower will charge at the first base station. If, however, the second distance does not exceed a current capacity of the mower, the mower may charge at either or both of the first and second base stations.

As described above, the determination to charge the mower at step 604 can be based on current charge level and location of the mower. In an embodiment, the determination at step 604 can be performed further in view of the determined distance and a current work plan of the mower. In this regard, the decision of when to charge the mower can be made with respect to a more complete understanding of the work plan.

In an embodiment, the mower may reserve a base station for charging after making a determination to charge. For example, if the mower decides to pass the first base station in order to charge at a second base station, the mower can reserve the second base station in advance, to prevent other mowers which may be utilized in the work area from docking with the second base station. This may be useful when the mowing system is operating with a plurality of mowers.

In an embodiment, the mowing system can include a plurality of mowers. The method 600 described herein can be utilized to determine charging protocols for each of the mowers.

In some instances, it may be helpful to update information associated with the mowing system or work area during or after completion of a mowing operation. For example, some work areas may include steep slopes that require elevated energy usage to traverse. If a mower experiences a higher-than-expected energy usage while traversing the steep slope, the determination to pass one base station for another may not be appropriate. That is, the mower may not make it to the next base station. In this regard, the mowing system can introduce a learning function whereby the mowers determine energy consumption using the work plan and inform future determinations of when to charge in view of the determined energy consumption. In such a manner, the mowers may more accurately maneuver between base stations to achieve an optimal charging protocol.

Grass grows at different rates based on a wide factor of environmental considerations. For instance, by way of another non-limiting example, grass growth rates may be influenced by season—e.g., temperature, sun exposure, moisture, etc. Over the course of several mowing operations, patterns relating to the energy consumption may emerge. For instance, in summer months the energy required to mow a work area may be higher than required to mow the same work area in the fall. By determining energy consumption, the mowing system can inform future determinations of when to charge. That is, for example, in summer months when current draw required to rotate the cutting blades is higher, the mower may charge at a first base station and not wait to reach a second base station which may be suitable for mowing operations in the fall when grass height is less. Similarly, the mower may decide to charge sooner in wet seasons which require greater energy to traverse the work area and greater energy to cut the grass. By storing information of energy usage, the mowing system may even be able to compare the energy usage against known energy usage rates. In this regard, the mowing system can determine initial energy usage per unit of mowing and then inform the remainder of that mowing operation based on the information associated with the initial energy usage. By way of example, if the initial energy draw is high as a result of wet conditions, the work plan can be adjusted to correspond with a previous work plan that was formed in view of previous conditions with a similar energy draw.

In one or more embodiments, the mowing system can map energy consumptions at different locations within the work area. In such a manner, the mowing system can inform decisions regarding when to charge the mower in view of known energy usage rates. By way of example, the work path may be adjusted to laterally traverse steep slopes rather than continuously climb and descend along the steep slopes. Similarly, areas where grass growth rates are known to be low (e.g., under trees) may utilize slower blade speed to conserve energy while areas where grass growth rates are known to be high (e.g., in open fields) may utilize higher blade speeds. By mapping the energy consumption at the different locations, these different mowing protocols can be employed. Further, these mowing protocols can be employed also in consideration of the location of the base stations for charging.

Figure 7:
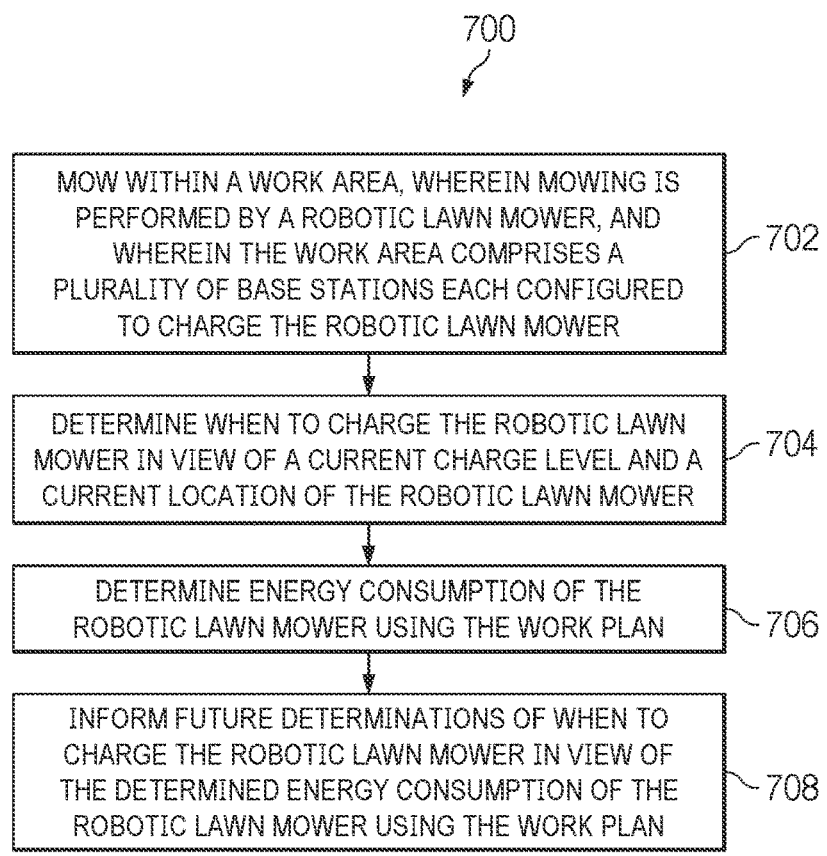
FIG. 7 is a flow chart of a method of operating a mowing system in accordance with an exemplary embodiment of the present disclosure.

FIG. 7 illustrates a method 700 of operating a mowing system including a step 702 of mowing within a work area using a work plan. Mowing can be performed by a robotic lawn mower. The work area can include a plurality of base stations each configured to charge the mower. The method 700 can further include a step 704 of determining when to charge the mower in view of a current charge level and a current location of the mower. The method 700 can further include a step 706 of determining energy consumption of the mower using the work plan. The method 700 can further include a step 708 of informing future determinations of when to charge the mower in view of the determined energy consumption of the mower using the plan.

As described above, determining energy consumption at step 706 may allow the mower to more accurately make decisions regarding charging protocols. By informing future determinations, the mowing system can improve and optimize over time in view of energy considerations.

Furthermore, when a plurality of mowers are utilized together in the work area, the step 706 of determining energy consumption may be utilized to best apportion zones within the work area.

Further aspects of the disclosure are provided by one or more of the following embodiments:

Embodiment 1. A method of operating a mowing system, the method comprising: mowing within a work area, wherein mowing is performed by a robotic lawn mower, and wherein the work area comprises a plurality of base stations each configured to charge the robotic lawn mower; and determining when to charge the robotic lawn mower in view of a current charge level and a current location of the robotic lawn mower.

Embodiment 2. The method of any one or more of the embodiments, wherein determining when to charge is performed by the robotic lawn mower, at least one of the plurality of base stations, or a combination thereof.

Embodiment 3. The method of any one or more of the embodiments, further comprising monitoring the current location of the robotic lawn mower; and determining a distance between the current location and at least one of the plurality of base stations.

Embodiment 4. The method of any one or more of the embodiments, wherein determining when to charge is performed in view of the current charge level, the determined distance, and a current work plan of the robotic lawn mower.

Embodiment 5. The method of any one or more of the embodiments, wherein determining the distance is performed by determining a first distance between the current location and a first base station of the plurality of base stations and determining a second distance between the current location and a second base station of the plurality of base stations.

Embodiment 6. The method of any one or more of the embodiments, further comprising determining at which of the plurality of base stations to charge the robotic lawn mower in view of the determined first distance and the determined second distance.

Embodiment 7. The method of any one or more of the embodiments, wherein the mowing system comprises a plurality of robotic lawn mowers, and wherein the method further comprises determining when to charge each of the plurality of robotic lawn mowers in view of a current charge level and a current location of each of the plurality of robotic lawn mowers.

Embodiment 8. The method of any one or more of the embodiments, wherein determining when to charge each of the plurality of robotic lawn mowers is performed further in view of a current occupancy of each of the plurality of base stations.

Embodiment 9. The method of any one or more of the embodiments, wherein the method further comprises determining at which of the plurality of base stations to charge each of the plurality of robotic lawn mowers in view of a current occupancy of each of the plurality of base stations.

Embodiment 10. The method of any one or more of the embodiments, further comprising: determining energy consumption of the robotic lawn mower when mowing within the work area; and updating information associated with determining when to charge the robotic lawn mower in view of the determined energy consumption.

Embodiment 11. A method of operating a mowing system, the method comprising: mowing within a work area, wherein mowing is performed by a plurality of robotic lawn mowers, and wherein the work area comprises a plurality of base stations each configured to charge the plurality of robotic lawn mowers; determining when to charge at least one of the plurality of robotic lawn mowers in view of a current charge level and a current location of the at least one of the plurality of robotic lawn mowers, and further in view of a current occupancy of each of the plurality of base stations.

Embodiment 12. The method of any one or more of the embodiments, wherein determining when to charge is performed further in view of determined energy consumption information associated with the work area.

Embodiment 13. The method of any one or more of the embodiments, wherein the method further comprising: determining energy consumption of at least one of the plurality of robotic lawn mowers when mowing within the work area; and updating information associated with determining when to charge the at least one of the plurality of robotic lawn mowers in view of the determined energy consumption.

Embodiment 14. The method of any one or more of the embodiments, wherein the plurality of base stations and the plurality of robotic lawn mowers form a network and communicate via a communication protocol.

Embodiment 15. The method of any one or more of the embodiments, wherein the communication protocol comprises a Bluetooth Low Energy (BLE) protocol, a Zigbee protocol, Lange Range (LoRa) protocol, a radio-frequency protocol, or Wi-Fi.

Embodiment 16. The method of any one or more of the embodiments, wherein the robotic lawn mowers communicate bidirectionally with each other, and wherein each of the plurality of robotic lawn mowers is configured to: determine a command for one of the other robotic lawn mowers based on data captured by a sensor; and provide the command to the one of the other robotic lawn mowers.

Embodiment 17. The method of any one or more of the embodiments, wherein the robotic lawn mowers are connected to form a chain of robotic lawn mowers where data is unidirectionally transferred from one of the plurality of base stations through the chain of robotic lawn mowers.

Embodiment 18. The method of any one or more of the embodiments, wherein each of the plurality of base stations is configures to act as a master for each of the plurality of robotic lawn mowers, and wherein each of the plurality of robotic lawn mowers is configured to act as a slave to each of the plurality of base stations.

Embodiment 19. The method of any one or more of the embodiments, wherein each of the plurality of robotic lawn mowers is configured to provide sensor data and location data to the other robotic lawn mowers via the plurality of base stations.

Embodiment 20. The method of any one or more of the embodiments, wherein the sensor data is captured by a sensor associated with the respective one of the plurality of robotic lawn mowers, and wherein the location data captured by a geolocation device associated with the respective one of the plurality of robotic lawn mowers.

Embodiment 21. The method of any one or more of the embodiments, wherein each of the plurality of robotic lawn mowers is configured to: determine location data relative to at least one of the plurality of base stations, and determine, based on the location data, an optimize a path through the work area.

Embodiment 22. The method of any one or more of the embodiments, wherein each of the plurality of base stations is configured to relay communications through at least one of the other robotic lawn mowers to one of the plurality of robotic lawn mowers when it is out of a broadcast range of the respective base station.

Embodiment 23. The method of any one or more of the embodiments, wherein each of the plurality of robotic lawn mowers is configured to connect to a different one of the plurality of base stations when a malfunction in a connected on of the plurality of base stations is determined.

Embodiment 24. The method of any one or more of the embodiments, wherein each of the plurality of base stations comprises a geolocation device and is configured to provide respective location data to each of the plurality of robotic lawn mowers.

Embodiment 25. A method of operating a mowing system, the method comprising: mowing within a work area using a work plan, wherein mowing is performed by a robotic lawn mower, and wherein the work area comprises a plurality of base stations each configured to charge the robotic lawn mower; determining when to charge the robotic lawn mower in view of a current charge level and a current location of the robotic lawn mower; determining energy consumption of the robotic lawn mower using the work plan; and informing future determinations of when to charge the robotic lawn mower in view of the determined energy consumption of the robotic lawn mower using the work plan.

Embodiment 26. The method of any one or more of the embodiments, wherein determining energy consumption comprises mapping energy consumption at different locations within the work area.

Embodiment 27. The method of any one or more of the embodiments, wherein informing future determinations of when to charge is performed in view of a work path of the work plan and the mapped energy consumption along the work path.

Embodiment 28. The method of any one or more of the embodiments, wherein the mowing system comprises a plurality of robotic lawn mowers, and wherein the method further comprises determining at which of the plurality of base stations to charge each of the plurality of robotic lawn mowers in view of a current occupancy of each of the plurality of base stations.

Embodiment 29. The method of any one or more of the embodiments, wherein the method further comprises performing additional mowing within the work area, and wherein determining at which of the plurality of base stations to charge each of the plurality of robotic lawn mowers during the additional mowing is further determined in view of the informed future determination.

Embodiment 30. The method of any one or more of the embodiments, further comprising monitoring the current location of the robotic lawn mower; and determining a distance between the current location and at least one of the plurality of base stations.

Embodiment 31. The method of any one or more of the embodiments, wherein determining the distance is performed by determining a first distance between the current location and a first base station of the plurality of base stations and determining a second distance between the current location and a second base station of the plurality of base stations, and wherein the method further comprises determining at which of the plurality of base stations to charge the robotic lawn mower in view of the determined first distance and the determined second distance.

This written description uses examples, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Thus, embodiments described herein provide, among other things, methods of operating a mowing system. Various features and advantages are set forth in the following claims.

What is claimed is:

1. A method of operating a mowing system, the method comprising:
   mowing within a work area by a robotic lawn mower traveling along a work path, wherein the work area comprises a plurality of base stations each configured to charge the robotic lawn mower, wherein at least one of the base stations defines an area within a prescribed distance of the respective base station, and wherein the work path enters the area a plurality of discrete times during a single mowing operation;
   determining an energy consumption of the robotic lawn mower associated with one or more previous or current mowing operations; and
   determining when to initiate charging of the robotic lawn mower based on a current charge level, the determined energy consumption, a remaining un-mowed portion of the work path, and a current location of the robotic lawn mower at the area.

2. The method of claim 1, wherein determining when to charge is performed by the robotic lawn mower and at least one of the plurality of base stations.

3. The method of claim 1, further comprising
   monitoring the current location of the robotic lawn mower; and
   determining a distance between the current location and at least one of the plurality of base stations.

4. The method of claim 3, wherein determining when to charge is performed further based on the determined distance and a current work plan of the robotic lawn mower.

5. The method of claim 1, wherein the work area is divided into a plurality of zones, wherein the robotic lawn mower remains in one of the plurality of zones when performing the mowing operation, and wherein a first base station of the plurality of base stations is disposed outside of all of the plurality of zones.

6. The method of claim 5, wherein the plurality of zones includes a first zone and a second zone, wherein the first and second zones partially overlap, and wherein a second base station of the plurality of base stations is disposed in an overlap between the first and second zones.

7. The method of claim 1, wherein the mowing system comprises a plurality of robotic lawn mowers, and wherein the method further comprises determining when to charge each of the plurality of robotic lawn mowers based on the current charge level and the current location of each of the plurality of robotic lawn mowers relative to the area.

8. The method of claim 7, wherein each of the plurality of robotic lawn mowers is configured to perform a separate mowing operation in one of a plurality of zones, and wherein at least two of the plurality of zones partially overlap one another.

9. The method of claim 1, wherein the work path is part of a work plan, and wherein the work plan further includes instructions to engage or disengage the mower blade.

10. The method of claim 1, further comprising determining to only partially charge the robotic lawn mower based on a work plan associated with the robotic lawn mower, the work plan including a remaining distance on the work path prior to completing the mowing operation.

11. A method of operating a mowing system, the method comprising:

mowing within a work area by a plurality of robotic lawn mowers each traveling along a separate work path, wherein the work area comprises a plurality of base stations each configured to charge the plurality of robotic lawn mowers, wherein at least one of the base stations defines an area within a prescribed distance of the respective base station, and wherein the work path of at least one of the plurality of robotic lawn mowers enters the area a plurality of discrete times during a single mowing operation;

determining when to initiate charging of the at least one of the plurality of robotic lawn mowers and reserving a particular base station of the plurality of base stations based on a current charge level, a remaining un-mowed portion of the work path, a current location of the at least one of the plurality of robotic lawn mowers at the area, and a current occupancy of each of the plurality of base stations.

12. The method of claim 11, wherein the plurality of robotic lawn mowers includes a principal robotic lawn mower and a secondary robotic lawn mower, wherein the principal robotic lawn mower acts as a middleman between at least one of the plurality of base stations and the secondary robotic lawn mower, and wherein, when the principal robotic lawn mower is operating at a sub-threshold charge level, principal status is delegated to the secondary robotic lawn mower.

13. The method of claim 11, wherein the method further comprising:
determining energy consumption of at least one of the plurality of robotic lawn mowers when mowing within the work area; and
updating information associated with determining when to charge the at least one of the plurality of robotic lawn mowers in view of the determined energy consumption.

14. The method of claim 11, further comprising adjusting a work plan of the at least one of the plurality of robotic lawn mowers based on an initial energy usage of the at least one of the plurality of robotic lawn mowers when performing a mowing operation in the work area, and wherein determining when to initiate charging is further based on the adjusted work plan.

15. The method of claim 11, wherein the at least one of the plurality of robotic lawn mowers has a learning mode in which the at least one of the plurality of robotic lawn mowers determines energy consumption using a work plan and updates information to affect a future work plan, and wherein determining when to initiate charging during the future work plan is effected by the updated information associated with the determined energy consumption.

16. The method of claim 14, wherein the robotic lawn mowers communicate bidirectionally with each other, and wherein each of the plurality of robotic lawn mowers is configured to:
determine a command for one of the other robotic lawn mowers based on data captured by a sensor; and
provide the command to the one of the other robotic lawn mowers.

17. The method of claim 14, wherein the robotic lawn mowers are connected to form a chain of robotic lawn mowers where data is unidirectionally transferred from one of the plurality of base stations through the chain of robotic lawn mowers.

18. The method of claim 11, wherein each of the plurality of base stations is configured to act as a master for each of the plurality of robotic lawn mowers, and wherein each of the plurality of robotic lawn mowers is configured to act as a slave to each of the plurality of base stations.

19. The method of claim 11, wherein each of the plurality of robotic lawn mowers is configured to provide sensor data and location data to the other robotic lawn mowers via the plurality of base stations.

20. The method of claim 19, wherein the sensor data is captured by a sensor associated with the respective one of the plurality of robotic lawn mowers, and wherein the location data captured by a geolocation device associated with the respective one of the plurality of robotic lawn mowers.

21. The method of claim 11, wherein each of the plurality of robotic lawn mowers is configured to:
determine location data relative to at least one of the plurality of base stations, and
determine, based on the location data, an optimize a path through the work area.

22. The method of claim 11, wherein each of the plurality of base stations is configured to relay communications through at least one of the other robotic lawn mowers to one of the plurality of robotic lawn mowers when it is out of a broadcast range of the respective base station.

23. The method of claim 11, wherein each of the plurality of robotic lawn mowers is configured to connect to a different one of the plurality of base stations when a malfunction in a connected one of the plurality of base stations is determined.

24. The method of claim 11, wherein each of the plurality of base stations comprises a geolocation device and is configured to provide respective location data to each of the plurality of robotic lawn mowers.

25. A method of operating a mowing system, the method comprising:
mowing within a work area using a work plan, wherein mowing is performed by a robotic lawn mower traveling along a worth path, wherein the work area comprises a plurality of base stations each configured to charge the robotic lawn mower, wherein at least one of the base stations defines an area within a prescribed distance of the respective base station, and wherein the work path enters the area a plurality of discrete times during a single mowing operation;
determining energy consumption of the robotic lawn mower using the work plan;
comparing the determined energy consumption against a known energy usage rate; and
determining when to initiate charging of the robotic lawn mower based on a current charge level, the comparing, a remaining un-mowed portion of the work path, and a current location of the robotic lawn mower at the area.

26. The method of claim 25, wherein determining energy consumption comprises mapping energy consumption at different locations within the work area.

27. The method of claim 26, wherein the robotic lawn mower is further configured to inform future determinations of when to charge based on a work path of the work plan and the mapped energy consumption along the work path.

28. The method of claim 25, wherein the mowing system comprises a plurality of robotic lawn mowers, and wherein the method further comprises determining at which of the plurality of base stations to charge each of the plurality of robotic lawn mowers in view of a current occupancy of each of the plurality of base stations, and reserving the base stations for each of the plurality of robotic lawn mowers based on the determining.

29. The method of claim 28, wherein the method further comprises performing additional mowing within the work area, and wherein determining at which of the plurality of base stations to charge each of the plurality of robotic lawn mowers during the additional mowing is further determined in view of the informed future determination.

30. The method of claim 25, further comprising monitoring the current location of the robotic lawn mower; and determining a distance between the current location and at least one of the plurality of base stations.

31. The method of claim 30, wherein determining the distance is performed by determining a first distance between the current location and a first base station of the plurality of base stations and determining a second distance between the current location and a second base station of the plurality of base stations, and wherein the method further comprises determining at which of the plurality of base stations to charge the robotic lawn mower in view of the determined first distance and the determined second distance.

\* \* \* \* \*